Figure 1:
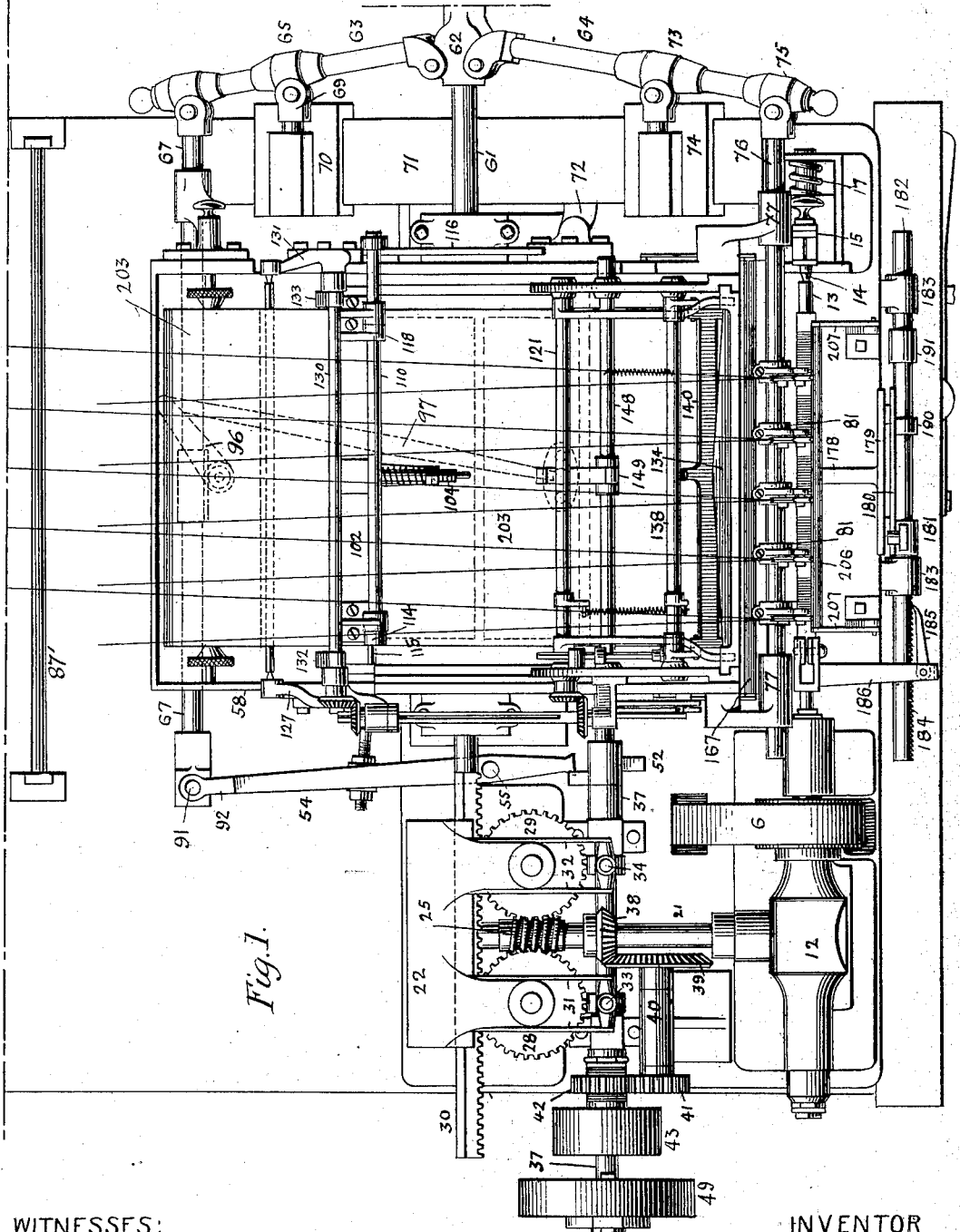

No. 654,583. Patented July 31, 1900.
J. C. ANDERSON.
MACHINE FOR WINDING AND INSULATING ELECTRIC COILS.
(Application filed Feb. 7, 1900.)
(No Model.) 14 Sheets—Sheet 1.

WITNESSES: INVENTOR
James C. Anderson
BY
ATTORNEY.

No. 654,583. Patented July 31, 1900.
J. C. ANDERSON.
MACHINE FOR WINDING AND INSULATING ELECTRIC COILS.
(Application filed Feb. 7, 1900.)
(No Model.) 14 Sheets—Sheet 4.

WITNESSES:
INVENTOR
ATTORNEY

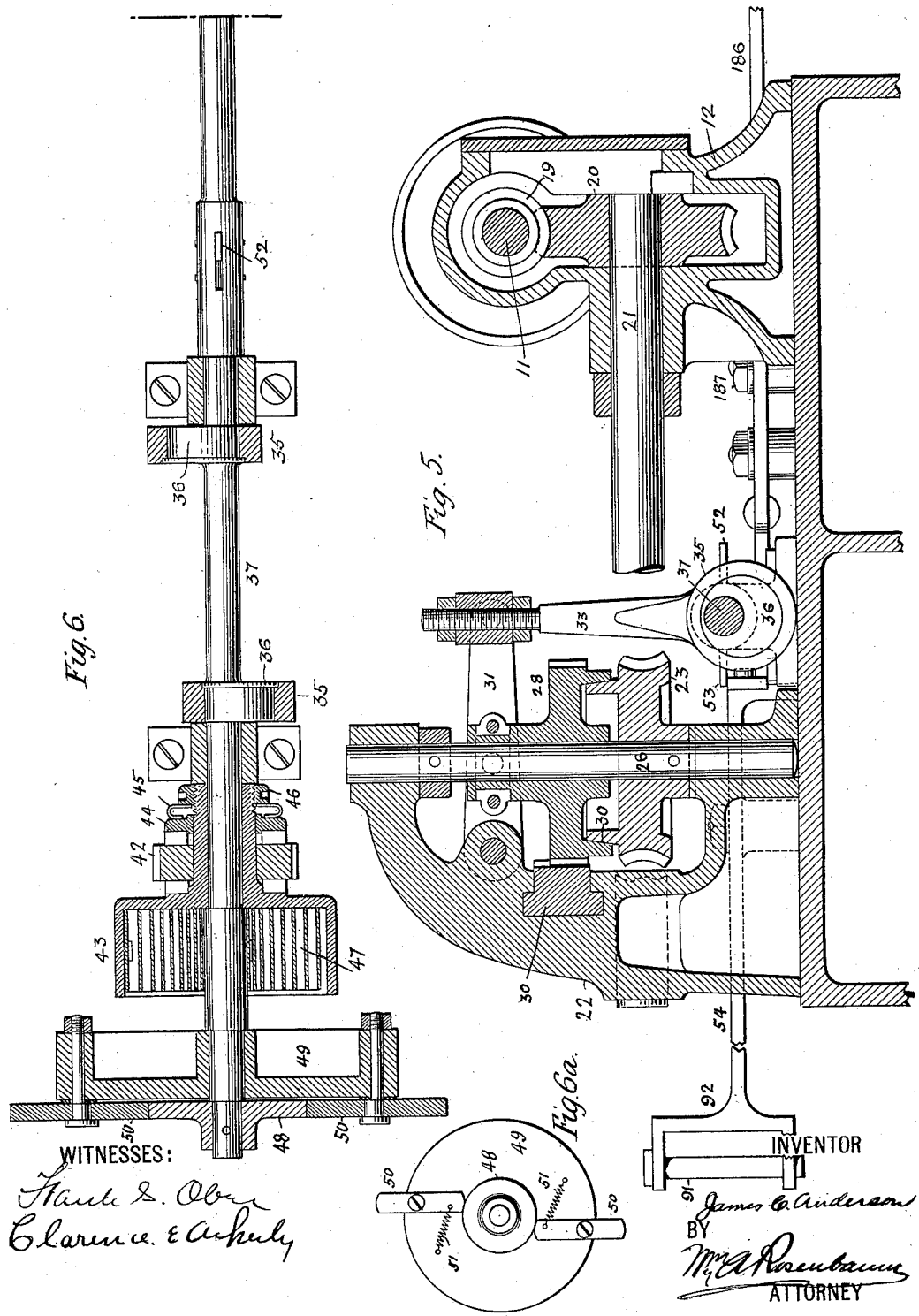

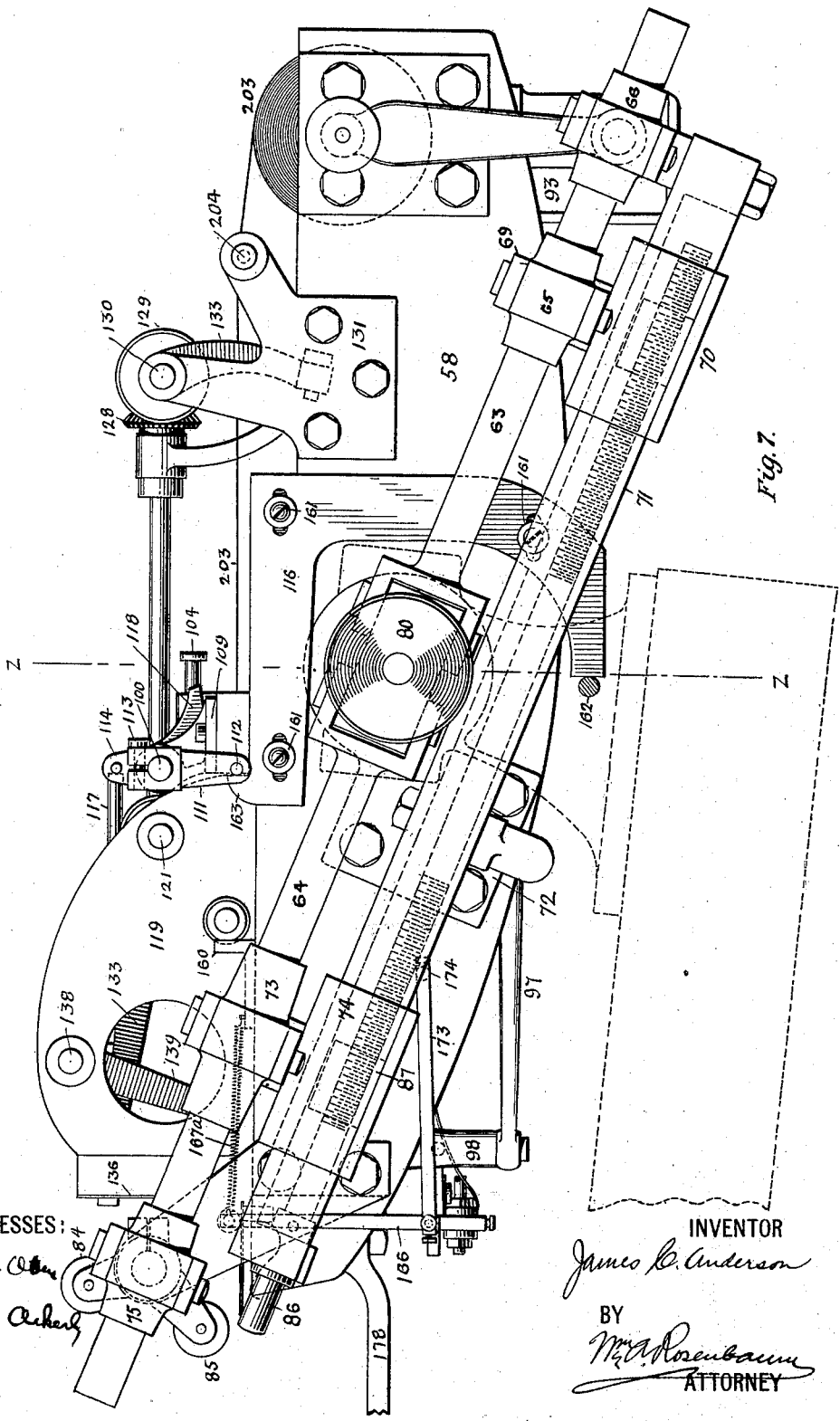

No. 654,583.  
J. C. ANDERSON.  
MACHINE FOR WINDING AND INSULATING ELECTRIC COILS.  
(Application filed Feb. 7, 1900.)  
Patented July 31, 1900.

(No Model.)

14 Sheets—Sheet 7.

WITNESSES:

INVENTOR  
BY  
ATTORNEY

No. 654,583. Patented July 31, 1900.
J. C. ANDERSON.
MACHINE FOR WINDING AND INSULATING ELECTRIC COILS.
(Application filed Feb. 7, 1900.)
(No Model.) 14 Sheets—Sheet 11.

WITNESSES:
Frank S. Ober
Clarence E. Ackerly

INVENTOR
James C. Anderson
BY
Rosenbaum
ATTORNEY

No. 654,583. Patented July 31, 1900.
J. C. ANDERSON.
MACHINE FOR WINDING AND INSULATING ELECTRIC COILS.
(Application filed Feb. 7, 1900.)
(No Model.) 14 Sheets—Sheet 13.

WITNESSES: INVENTOR
James C. Anderson
BY
ATTORNEY

No. 654,583. Patented July 31, 1900.
J. C. ANDERSON.
MACHINE FOR WINDING AND INSULATING ELECTRIC COILS.
(Application filed Feb. 7, 1900.)
(No Model.) 14 Sheets—Sheet 14.

WITNESSES:
Frank S. Ober
Clarence E. Asherly

INVENTOR
James C. Anderson
BY
Wm. A. Rosenbaum
ATTORNEY

UNITED STATES PATENT OFFICE.

JAMES C. ANDERSON, OF JERSEY CITY, NEW JERSEY.

MACHINE FOR WINDING AND INSULATING ELECTRIC COILS.

SPECIFICATION forming part of Letters Patent No. 654,583, dated July 31, 1900.

Application filed February 7, 1900. Serial No. 4,381. (No model.)

*To all whom it may concern:*

Be it known that I, JAMES C. ANDERSON, a citizen of the United States, residing at Jersey City, in the county of Hudson and State of New Jersey, have invented certain new and useful Improvements in Automatic Winding-Machines, of which the following is a full, clear, and exact description.

This invention relates to means for winding material in the form of fibers, filaments, strands, or strips into coils, bobbins, helices, or other formation produced by superposing the convolutions and for applying or introducing sheet material, such as paper or textile fabric, at intervals in the coil or bobbin for the purpose of separating, protecting, or restraining the convolutions thereof.

The object of the invention is to provide a machine by which this work can be effectively, rapidly, and cheaply accomplished.

In carrying out the invention a machine has been produced for the specific purpose of winding wire into coils, bobbins, or helices and introducing at intervals therein sheets of paper, and such a machine forms the subject of the detailed description which follows hereinafter; but it will be understood that this machine is selected only as one example of what may be done with fibers, filaments, or strands in conjunction with sheet material and that the invention extends to the use of the machine for winding fibers, filaments, strands, or strips of any other material or combinations of material and for introducing into or upon the body of the coil, bobbin, or helix sheet material of any character or construction.

The wire coils or helices wound by the machine herein described are intended for electrical purposes, so that the various convolutions thereof must be insulated from each other and maintained in an insulated or isolated state. One of the advantages of the present invention is the fact that it is possible to wind naked wire, and therefore at once eliminate the cost of covering or insulating the wire before it is wound into the coil. This is accomplished partly by the fact of the sheets of paper which are inserted by the machine between every two layers of wire and partly by the fact of alternating with the wire a thread of insulating material, so that the convolutions of wire in any given layer are insulated by the interwound convolutions of insulating material, while the convolutions of wire in one layer are insulated from those in adjacent layers by the interposed paper sheet. It is a comparatively-simple problem to wind successive layers of wire either with or without the interwound silk or other insulating thread; but to introduce between each layer the sheet of paper or other insulating material automatically and without stopping or slowing up the rotation of the winding-spindle, and to provide for the necessarily-increasing length of such sheets, due to the increase in diameter of the coil, and to provide for the proper feeding of the paper to the rotating coil, which gradually increases in diameter, are problems which are not so easily solved, but which are solved by this invention.

In this machine one or a plurality of helices may be wound simultaneously, and as the latter plan turns out the work more rapidly it is, of course, preferable. When a number of coils are wound simultaneously, a single tube, core, or spindle common to all of them is used, and the wire is wound upon it on slightly-separated zones and each insulating sheet of paper is common to all the coils— that is to say, if five coils are wound simultaneously upon the machine a layer on each coil is finished at the same instant and at that instant a sheet of paper wide enough to extend throughout the five coils and long enough to surround the coils and slightly overlap is inserted, and these successive sheets of paper, together with the central spindle upon which all the coils are wound, serve to mechanically connect all of the coils together, and they may all be removed from the machine at the same time, after which, for commercial purposes, the several connected coils may be separated into individual coils by cutting or sawing through the several sheets of paper and the central core exposed between the zones occupied by the coils.

Figure 2:
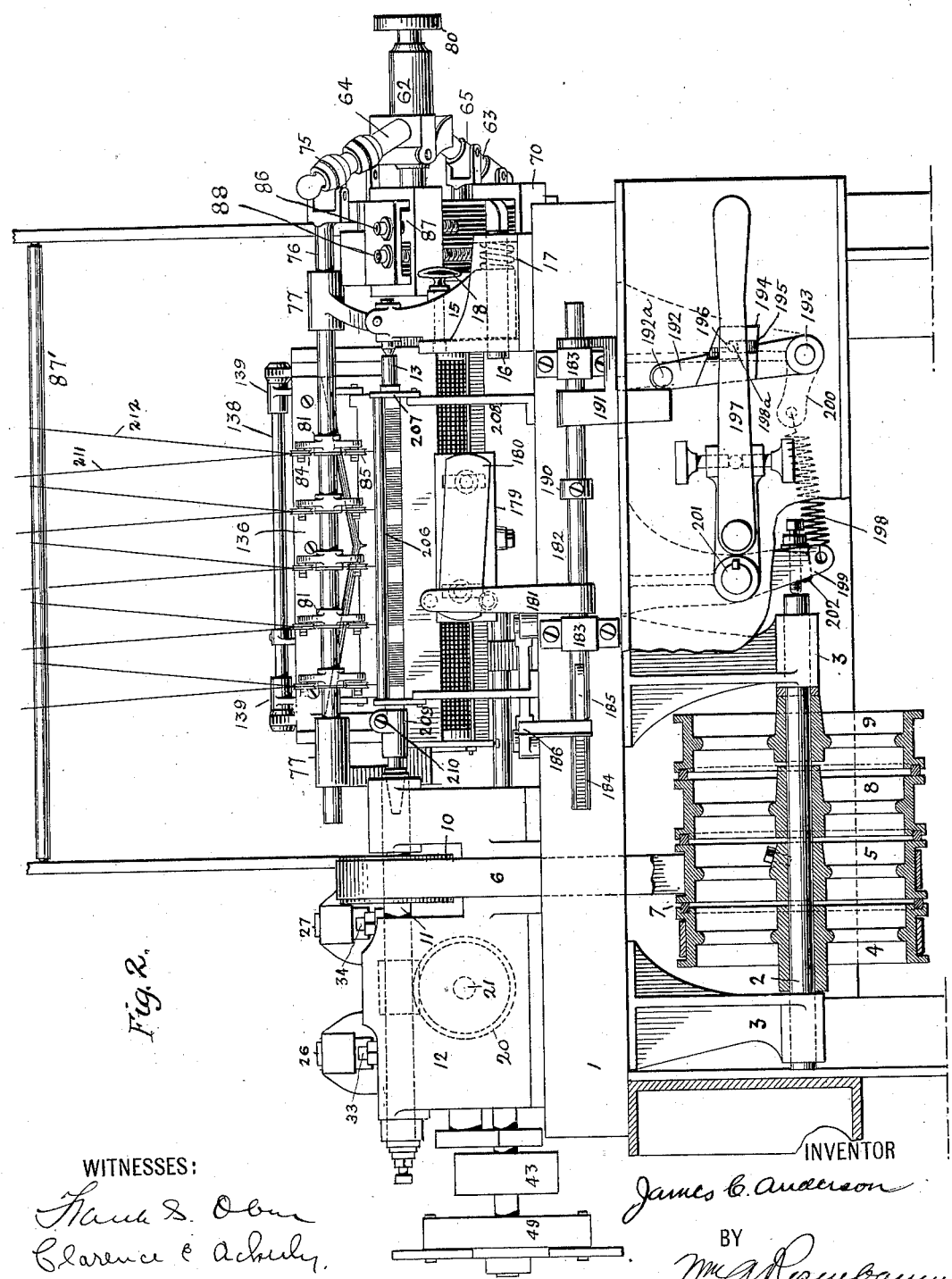
Figure 3:
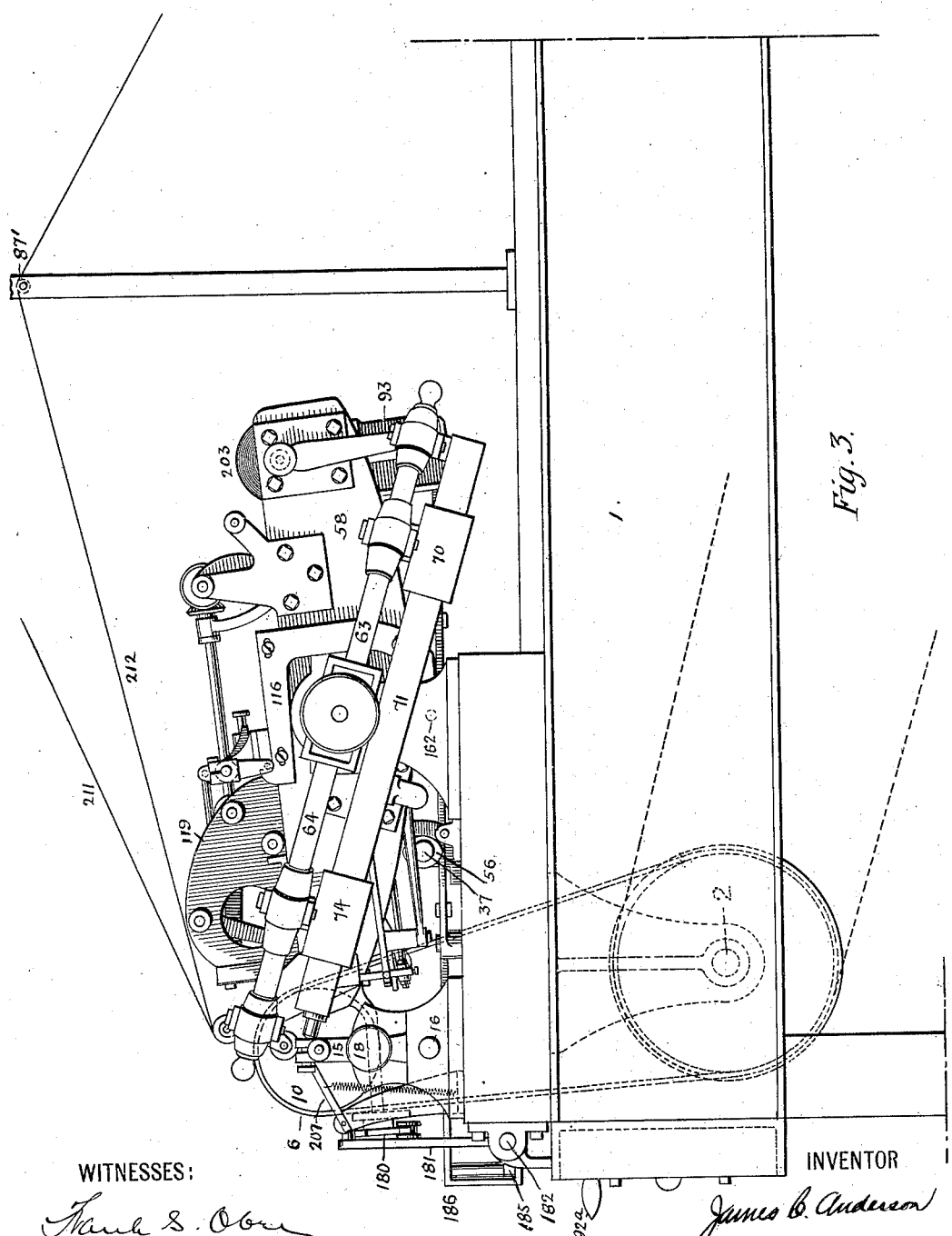
Figure 4:
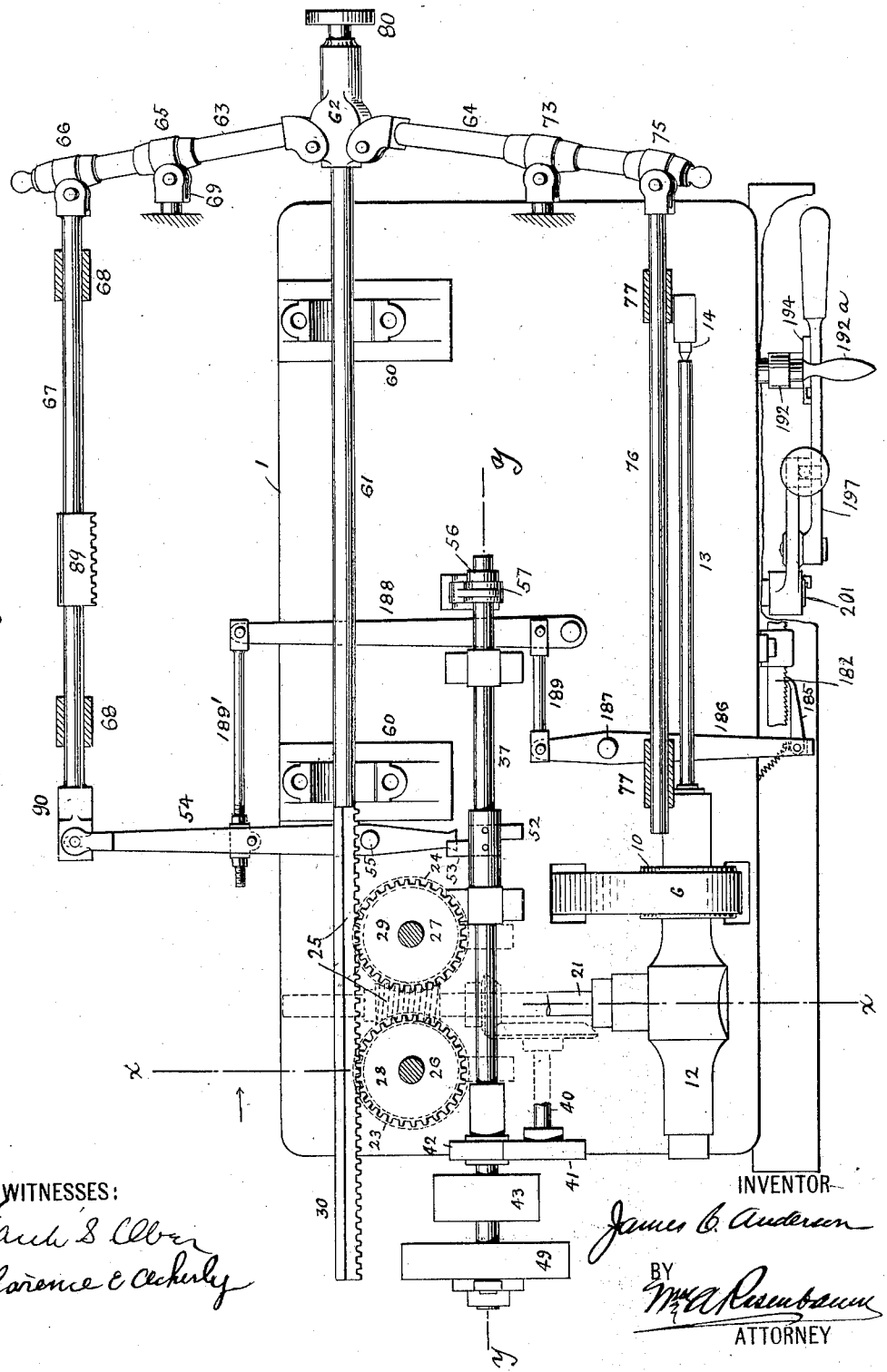
Figure 8:
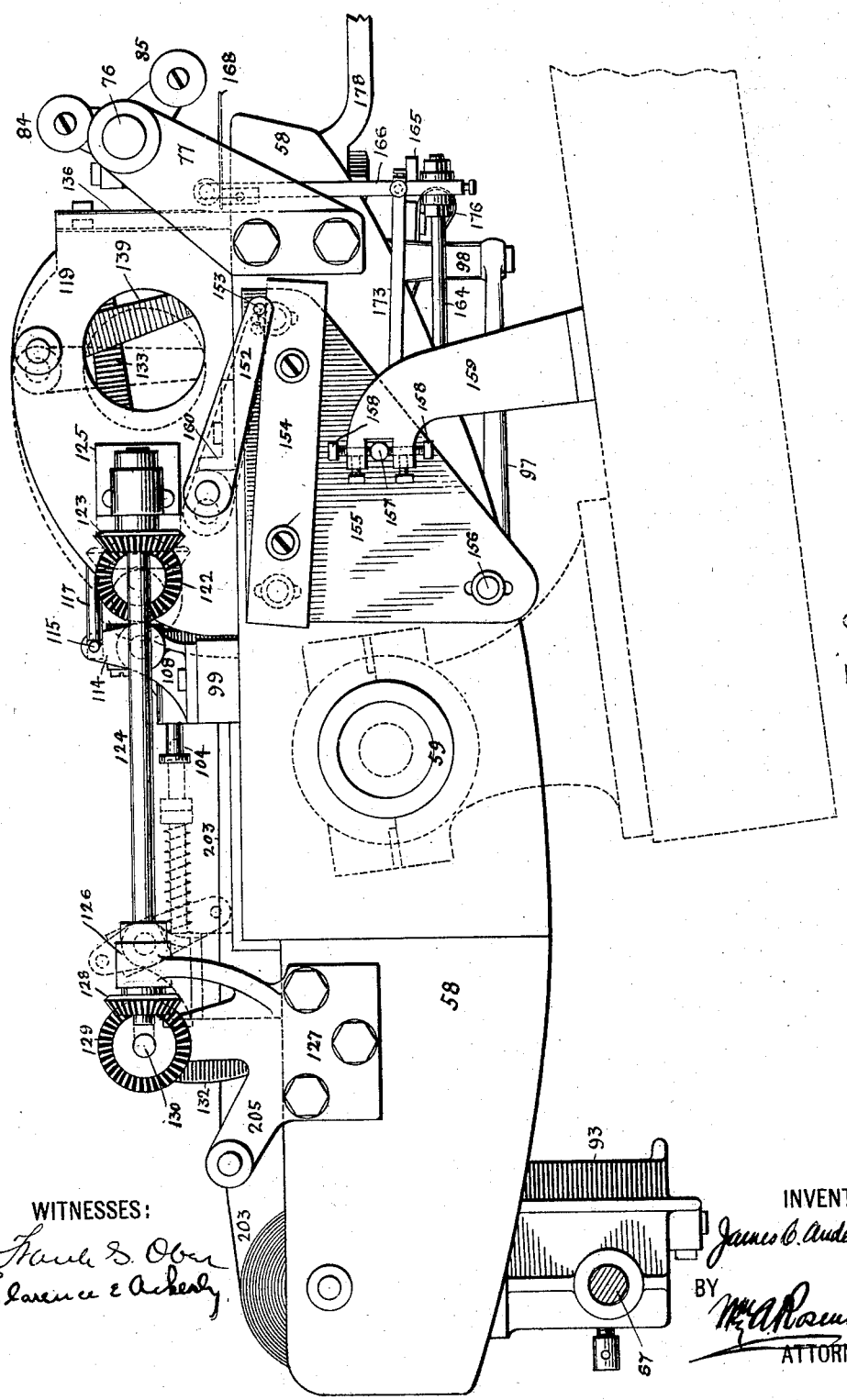
Figure 9:
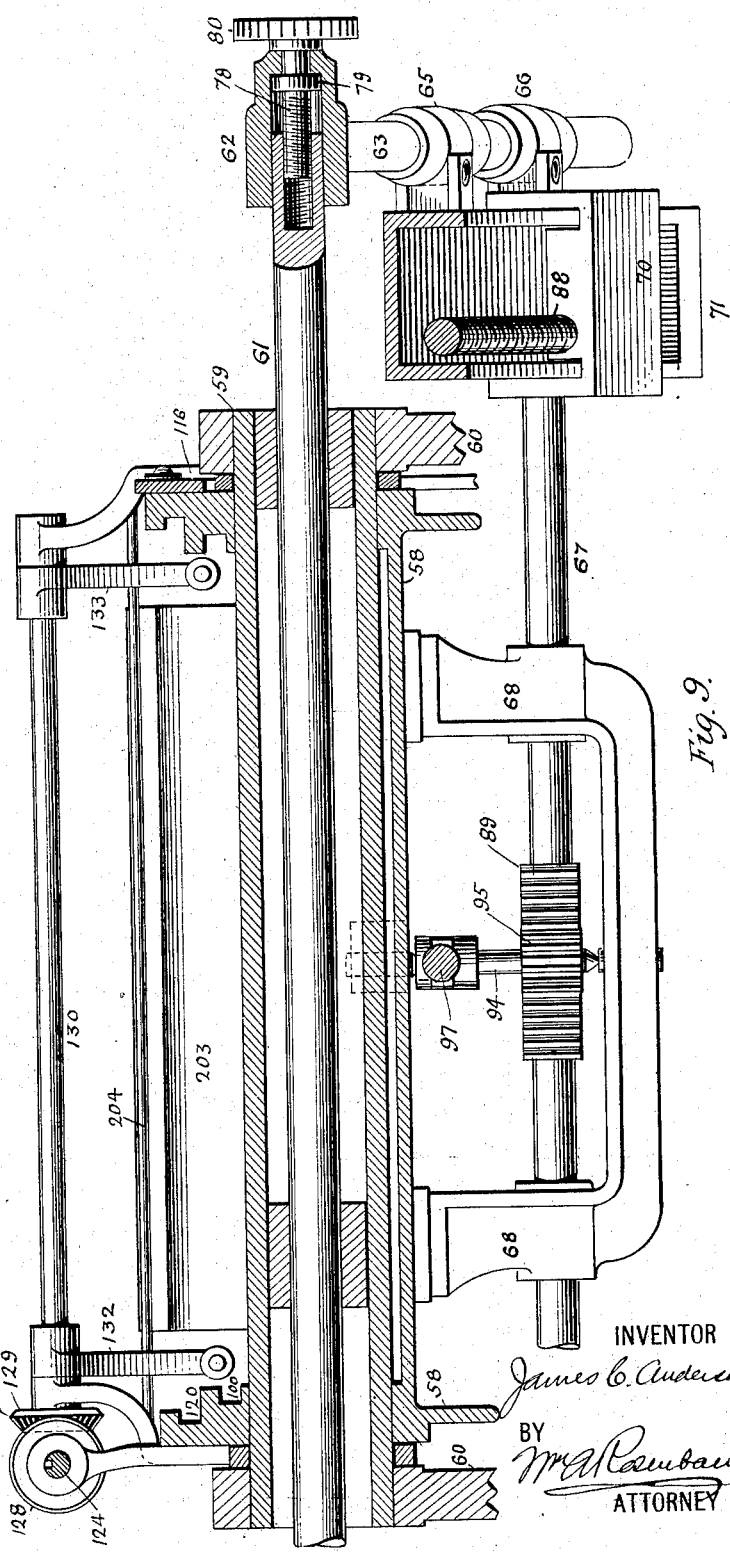
Figure 10:
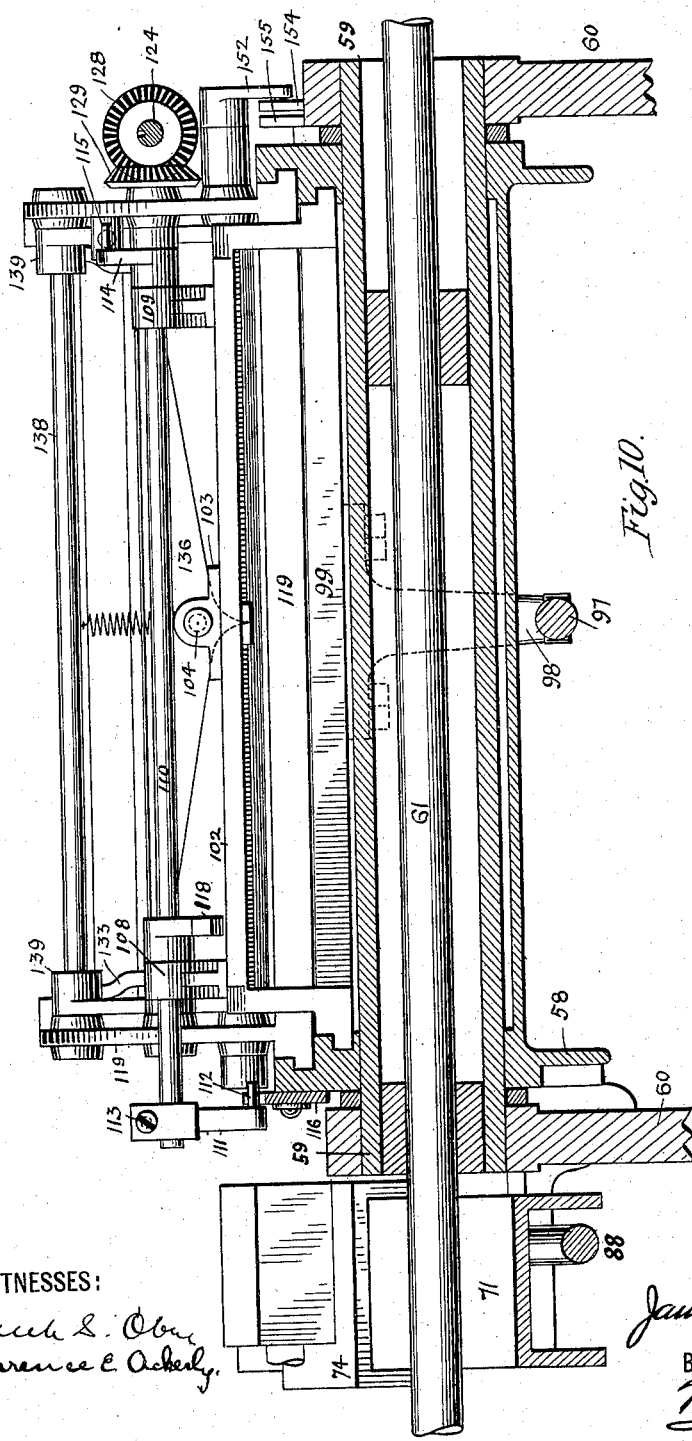
Figure 11:
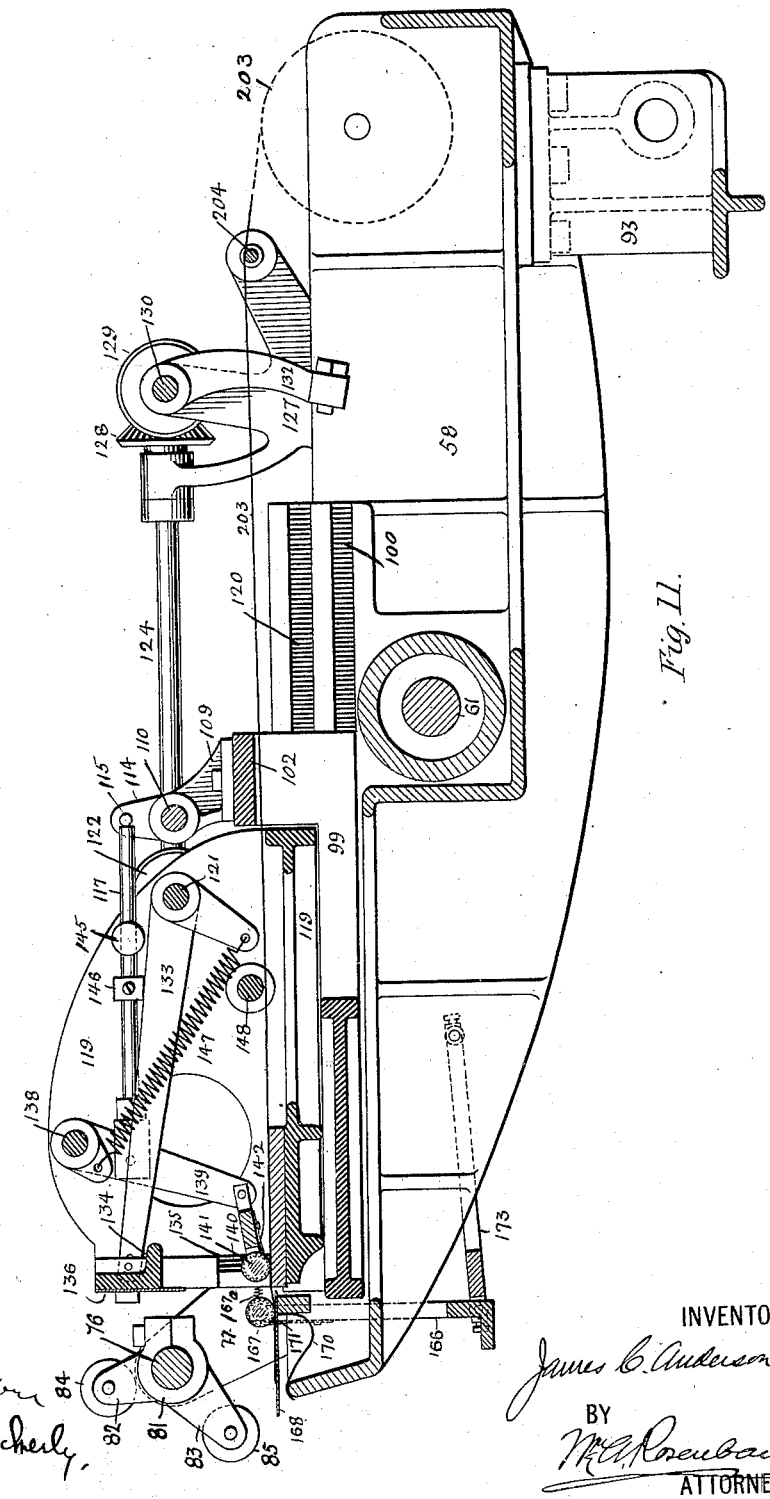
Figure 12:
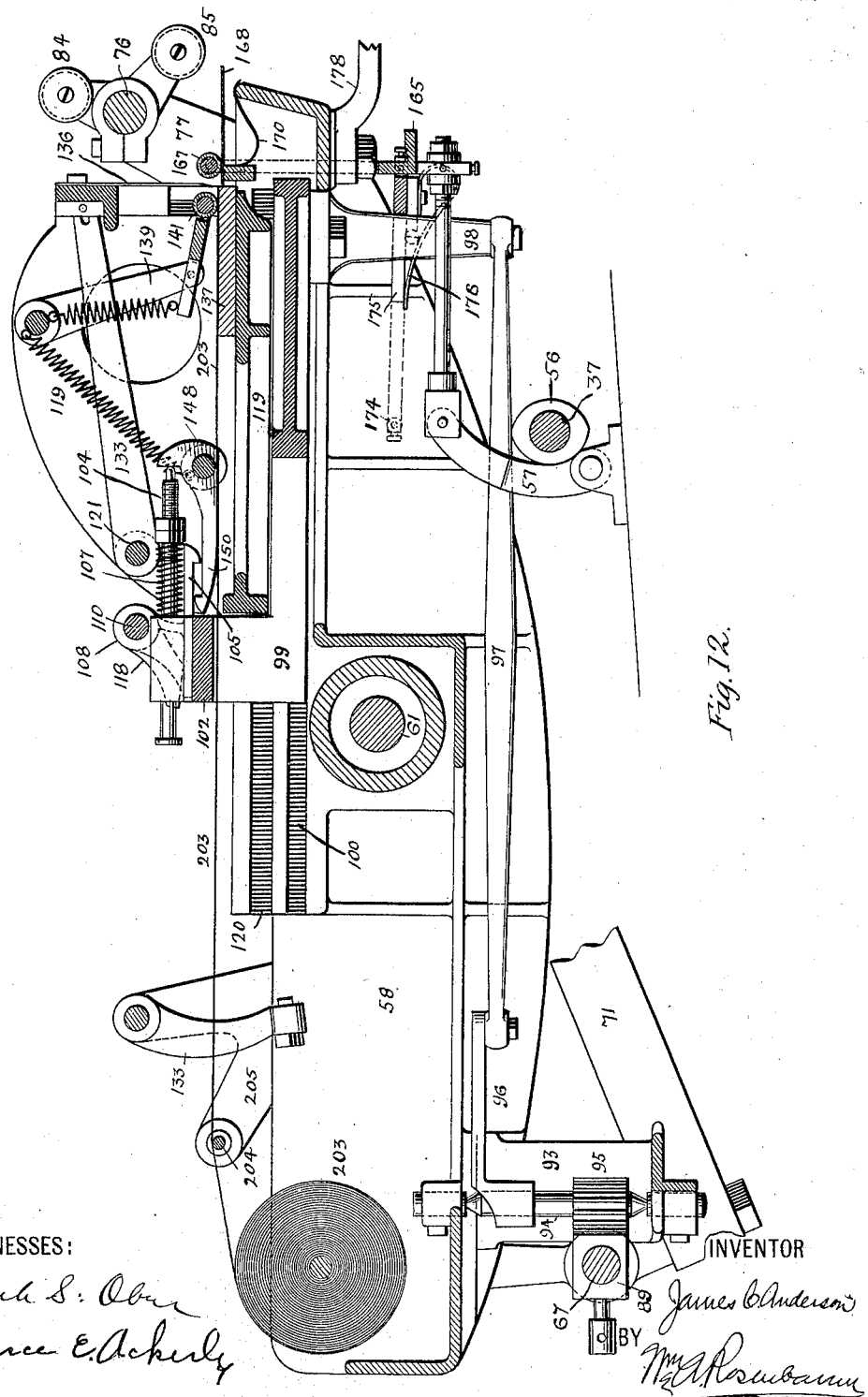
Figure 13:
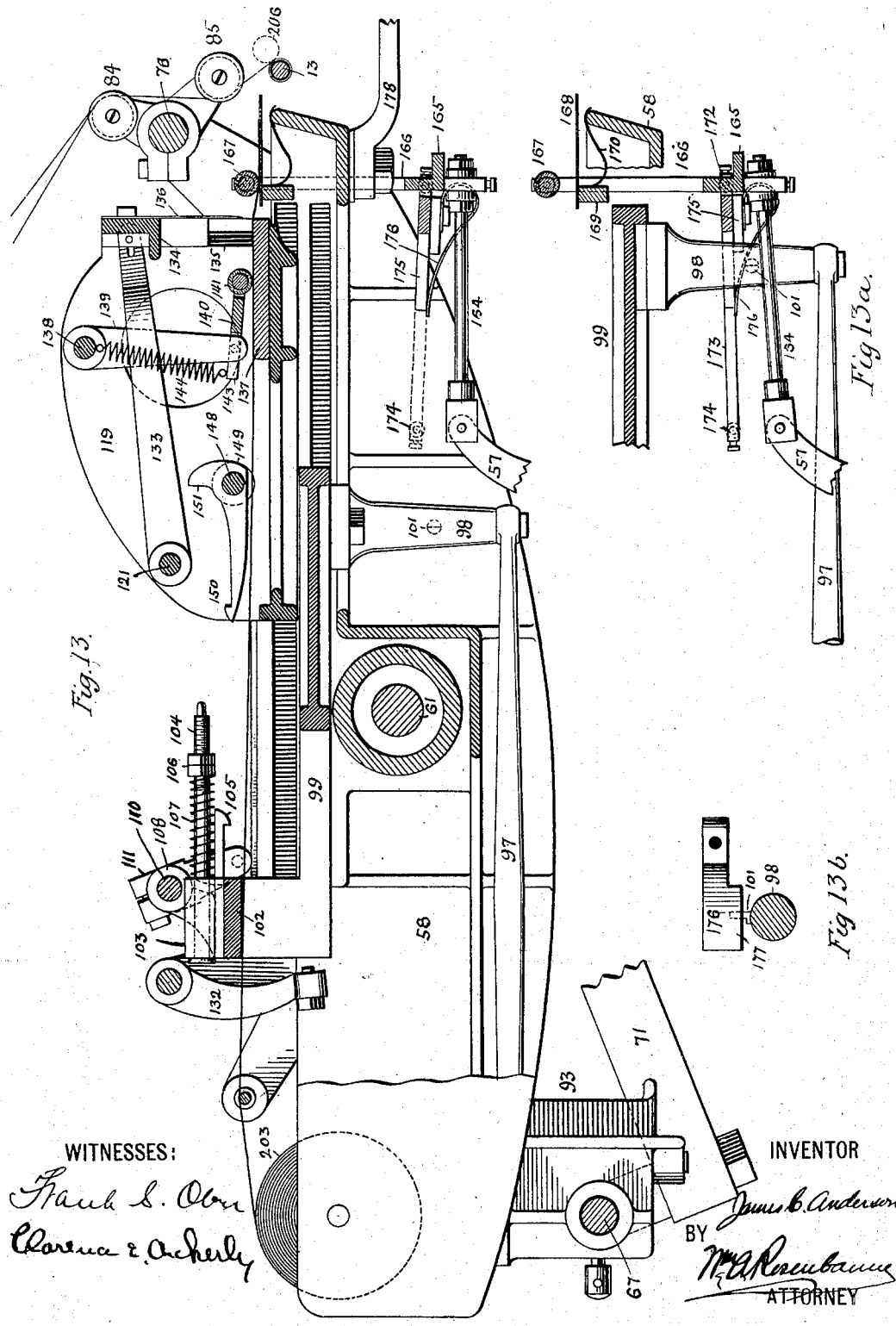
Figure 15:
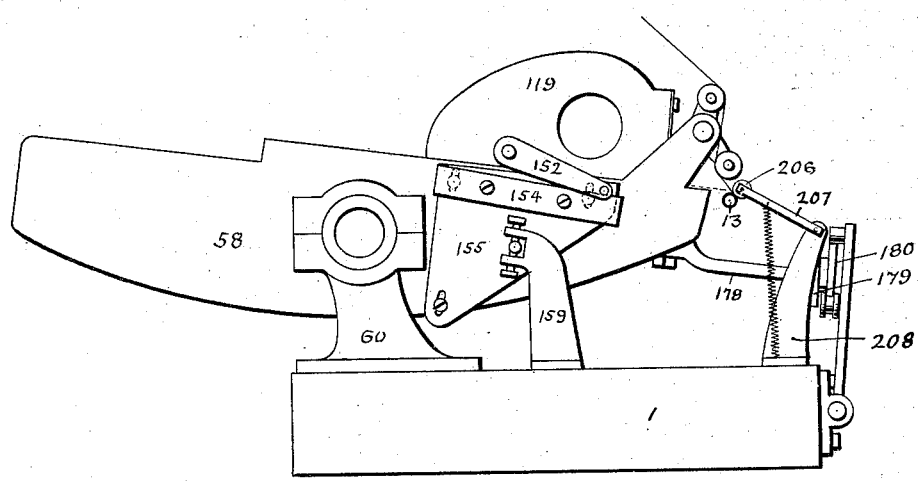
Figure 16:
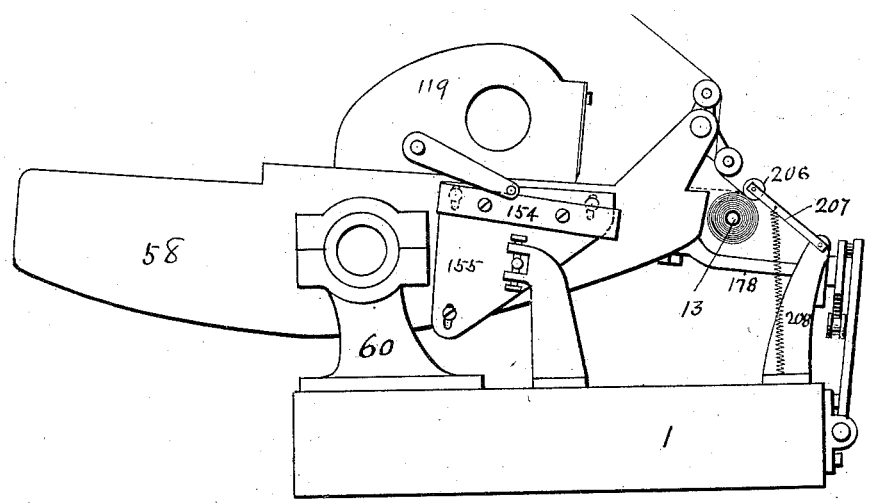
Figure 18:
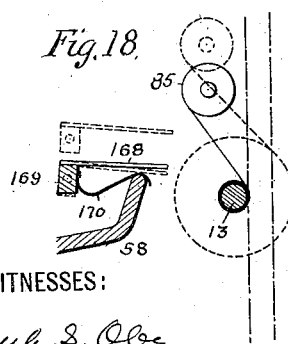
Figure 17:
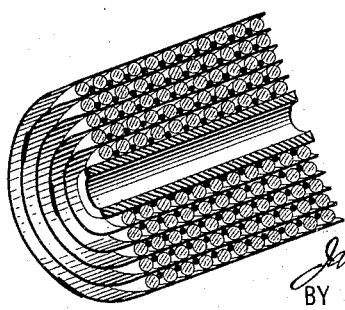

In the accompanying drawings, Figure 1 is a plan of the entire machine. Fig. 2 is a front elevation of the entire machine with parts of the frame broken away. Fig. 3 is a side elevation of the entire machine on a small scale. Fig. 4 is a plan of the machine with the carriage removed. Fig. 5 is a section on line $xx$ of Fig. 4. Fig. 6 is a section on line $yy$ of Fig. 4. Fig. 6ª is a detail of Fig. 6. Fig. 7 is a side elevation of the carriage and its attachments enlarged. Fig. 8 is a side elevation opposite that of Fig. 7. Fig. 9 is a vertical section on line $zz$ of Fig. 7 looking rearward. Fig. 10 is a section on line $zz$ of Fig. 7 looking forward. Figs. 11, 12, 13, and 14 are longitudinal sections of the carriage with some parts removed for clearness. Figs. 13ª and 13ᵇ are details of the paper-injecting mechanism. Figs. 15 and 16 are side elevations of the carriage, showing its different positions when at the beginning and ending of the coil. Fig. 17 is a section, enlarged, of a single coil or helix made on this machine; and Fig. 18 is a diagram representing the shifting of the position of the tangent-point between the strands of wire leading to the coil and the surface of the coil.

Referring to the drawings, in which figures are used for reference, 1 indicates the main frame of the machine, consisting, essentially, of a platform or table standing on legs.

2 is a shaft mounted beneath the table in brackets 3, near the front thereof, upon which is a loose driving-pulley 4, receiving power by belt from the source of power which actuates the machine. This pulley runs constantly, and next to it, fixed to the shaft, is a pulley 5, from which the machine is directly driven by belt 6, said pulley 5 being driven by frictional engagement with the pulley 4, which is accomplished by forcing the shaft to which pulley 5 is rigidly connected over to the left until it bears against the pulley 4, the frictional contact occurring between the rims of the two pulleys, as indicated at 7, and the pulley 4 being held in position by the bracket 3, against which its hub rests. Other pulleys 8 and 9 are mounted on the shaft 2; but as they play no part in the action of the machine, as herein described, they will not be further referred to. The belt 6 extends through the table of the machine and drives a pulley 10 on a counter-shaft 11, mounted in a supplemental box-like frame 12. An extension of this shaft to the right and across the front of the machine constitutes a winding-spindle 13, upon which the material is to be wound in the process of making the coils. The outer end of this winding-spindle when in action is supported by a center bearing 14, carried at the upper end of a block 15, which is pivoted to a part of the frame on the stud 16, a spring 17 serving to hold the point 14 against the end of the spindle. By swinging this block in a plane at right angles to the spindle the end of the spindle is uncovered to permit of a tube or core being slipped on or off from it.

18 is a latch-bolt passing through the block 15 and adapted to enter an opening in the frame to prevent the block from swinging on its pivot 16 when in its working position and must be withdrawn before the block can be swung. At the other end of the spindle is a pair of spring-jaws 209, which may be set up by a screw 210. This serves as a clutch for holding the center tube or core upon which the strands are wound.

On the shaft 11, to the left of the pulley 10 and inside of the frame 12, is a worm 19, engaging with a worm-gear 20 on a shaft 21, standing at right angles to shaft 11 and running toward the rear of the machine. This shaft has its bearing in the frame 12 and in another supplemental frame 22. Shaft 21 passes between two horizontal worm-gears 23 and 24 and engages both of them by means of a worm 25, which it carries. These gears are fixed on short vertical shafts 26 and 27, respectively, which therefore rotate constantly in opposite directions. Above each of the gears 23 and 24 and on their respective shafts are the spur-gears 28 and 29, having frictional clutch-faces 30, with which they are adapted to engage with corresponding faces on the respective worm-gears, so that said spur-gears may be driven by the worm-gears, said spur-gears being loose on the shafts 26 and 27, but adapted to slide vertically thereon. Both spur-gears are constantly in mesh with a rack-bar 30, arranged horizontally and fitted in a slideway in the frame 22. The width of the teeth of the rack is sufficient to allow the spur-gears to move into and out of frictional engagement with the worm-gears without moving out of mesh with the rack. Thus it will be seen that since the shafts 26 and 27 are driven in opposite directions the direction in which the rack 30 will travel at any given time depends upon which of the spur-gears is in engagement with its corresponding worm-gear, and the arrangement is such, as will be hereinafter described, that only one of the spur-gears will be connected to its worm-gear at the same time. The spur-gears are shifted vertically by means of pivoted levers 31 and 32, the free ends of which extend forward horizontally and engage with upright arms 33 and 34, carrying circular straps 35, embracing eccentrics 36 36 on a shaft 37, which intermittently makes half-rotations. The eccentrics are oppositely placed, so that at each half-rotation of the shaft 37 one of the levers 31 and 32 will be lifted and the other lowered to effect the engagement and disengagement of the spur and worm gears.

Shaft 21 carries bevel-pinion 38, which engages pinion 39 on a short shaft 40, carrying a spur-gear 41, which engages with a pinion 42 on the shaft 37. Pinion 42 is connected with shaft 37 through a spring-drum 43, with which it makes a frictional engagement through the friction-disk 44, fixed to slide, but not turn, upon the hub of the drum. The sprin 45 and nut 46 determine the amount of f tion between the drum and the pinion. side of the drum is a spring 47, secured at outer end to the drum and at its inner end to the shaft. The pinion 42 is rotated constantly by the gearing behind it, and the drum is rotated by the pinion until the tension of the spring 47 overcomes the frictional engagement between the pinion and the drum, after which the drum remains stationary and the pinion slips. On the outer end of shaft 37 is fixed a disk 48 and loosely upon the shaft beside it is a weighted disk 49. To the outside of the disk 49 are pivoted two arms 50, having eccentric faces held in contact with the rim of disk 48 by springs 51. Thus when the shaft 37 makes its half-rotations in the manner hereinafter described the arms 50 grip the disk 48 and the weighted disk 49 is carried with the shaft. At the end of such half-rotation the inertia of the weighted disk tends to carry it farther, and it is permitted to do so because the arms 50 do not grip when the disk 49 continues in the same direction in which the shaft started it.

Shaft 37 carries two flat wings 52 and 53, located one hundred and eighty degrees apart, the width of one in the direction of the shaft commencing in the same plane where the width of the other ends. In conjunction with these wings a movable stop acts to control the intermittent half-rotations of the shaft 37. This movable stop consists of a lever 54, pivoted to the table at 55 and adapted to vibrate in a horizontal plane. The forward end of this lever is flat and adapted to engage with either of the wings 52 53, depending upon its position. In its vibrations it moves out from under one of the stops, thus permitting shaft 37 to rotate, and into the path of movement of the other, thus stopping the shaft at the end of a half-rotation. The power that drives the shaft during these half-rotations is that which has been stored in the spring 47 in the interval between the rotations. It will be seen that with each half-rotation of the shaft the spring is unwound, and the function of the gearing between the pinion 42 and the shaft 21 is to wind up the spring to the extent which it unwinds, and this it does each time somewhat before a wing on the shaft is released.

Unless some provision was made for preventing a sharp stroke of the wings upon the end of the stop-lever 54 either the wings or the lever would soon break, as the constant hammering would shatter any structure that could conveniently be used. To prevent such a result is one of the objects of the weighted wheel 49. The action of the spring upon the shaft 37 when a wing is released is very powerful; but instead of merely carrying the wings around it must also start the weighted wheel from its position of rest. This very much weakens the blow of the wing. It is better to apply a large force to the shaft and retard the movement created by such force than it is to use a smaller force and allow it to act quickly, for with an abundance of power retardations due to momentary extra friction or additional load from any cause are relatively of less importance. Another function of the weighted wheel 49 is to insure that the movement of the shaft 37 shall occupy an appreciable amount of time, so that certain movements and operations of the machine which are accomplished by and simultaneously with this movement of the shaft will have time enough to be accomplished nicely. The impetus given to the weighted wheel in its half-rotation starts it spinning around; but it comes to a gradual stop before the next half-rotation of the shaft. These half-rotations of the shaft are directly instantaneous. Each time the movement of the shaft takes place the eccentrics 36 36 act to shift the clutch connections between the spur and worm gears, and thus reverse the direction of movement of the rack-bar 30.

Shaft 37 extends to the right to about the middle of the table, where it carries a double-lobed cam 56, the periphery of which rests against a curved lever 57, pivoted to the top of the table and extending upward therefrom.

The power-distributing devices having now been described, it may be mentioned that the more important features of the invention which are to be hereinafter described are operated solely from the reciprocating rack-bar 30 and the rotating shaft 37, the former playing much the more important part in that it operates almost the entire mechanism now to be referred to.

Over the right-hand end of the table is mounted a boat-shaped carriage 58, consisting of two parallel side pieces connected together across the ends and middle, all of the parts making up the carriage being indicated by the same figure 58. The front side of this carriage is located above the front edge of the main table immediately back of the winding-spindle 13. The carriage is mounted on trunnions 59 59, which have their bearings in bolsters 60 60, resting upon the table. The trunnions are formed by the projecting ends of a tube which extends transversely through the carriage, and through this tube the rack-bar 30, which is extended in the form of a rod 61, passes and projects beyond the right-hand side of the carriage. The carriage is adapted to partake of a movement upon its trunnions which at its forward ends is substantially equal to the depth of the helix or helices to be wound, this swinging movement being adjustable for different sizes of helices. The rod 61 in passing through the trunnions of the carriage does not interfere with this movement of the carriage, nor is its own reciprocating motion interfered with by the movement of the carriage. The extreme right-hand end of the rod 61 carries a block 62, to which are pivoted two rods 63 and 64, extending the former rearward and downward from the block and the latter forward and upward from the block alongside of the carriage. Rod 63 passes loosely through a sleeve 65 and loosely through another sleeve 66 at its extremity, the latter sleeve being pivoted to a rod 67, sliding in bracket-bearings 68, depending from the under side of the carriage at the rear. The sleeve 65 is pivotally attached to a yoke 69, carried by a block forming part of a rectangular sleeve 70. This sleeve is adjustable upon a bar 71 in a manner to be hereinafter described, and the bar is attached to the side of the carriage by means of a bracket 72. The rod 64 also passes through a loose sleeve 73, similarly connected with an adjustable block 74 on the bar 71; also, the rod 64 at its extremity passes loosely through a sleeve 75, which is pivotally connected with a guide-rod 76, mounted across the front of the carriage in bearings 77 and parallel to, just above, and to the rear of the winding-spindle 13. The connection between the rack-bar 61 and the block 62 is in the nature of a swivel, so as to permit the rods 63 and 64 to swing with the rod without twisting the rod. The construction of the block 62 is shown in section in Fig. 9. The end of the rod passes freely into the block and is held therein by an axial screw 78, passing through the end of the block and entering a threaded hole in the end of the rod. The screw is held from longitudinal motion by the collar 79 and the nut 80. Besides furnishing this swivel connection this construction also affords a means for setting the inner ends of the rods 63 and 64 inward or outward with respect to the rod 61, for a purpose which will hereinafter appear. It will now be seen that the reciprocations of the main actuating-rod 61 will pass through the rods 63 and 64, causing the rod 67 at the rear and the rod 76 at the front of the carriage, respectively, to reciprocate, and that the extent of movement of the rods 67 and 76 can be adjusted by shifting the adjustable sleeves 70 and 74 toward or away from the axis of the carriage. The strands of copper or other material which the machine is to wind onto the spindle 13 are guided by suitable guiding devices, to be hereinafter described, fixed upon the rod 76. The rate of travel of this rod 76 in its reciprocation determines the number of turns per inch in the layer, and the length of the reciprocations of the rod 76 determines the length of the layer of winding in the coil or coils, and consequently the length of the finished coil, since one layer is wound directly upon the other.

In the drawings I have shown the rod 76 equipped with five guiding devices for the material to be wound, which indicates that the machine is adapted to wind five coils simultaneously; but it will be understood that the operation is the same whether one or more coils are wound and that the number of guiding devices on the rod 76, and consequently the number of coils that may be wound on the machine, may be increased to any practicable extent. The guiding devices referred to consist of brackets 81, clamped upon rod 76 and having two arms 82 and 83, occupying an angular position with respect to each other and carrying at their extremities grooved guide-wheels 84 and 85, respectively. The wire, silk thread, or other material to be wound leads from spools in a spool-rack (not shown) over elevated rails 87', thence down and over the front of wheel 84, around the back of wheel 85, and thence to the winding-spindle 13. In the drawings I have shown two strands running to each guiding device, which indicates that a bare copper wire and a silk thread are wound side by side in each layer of the coil, the silk thread serving as the insulator between adjacent convolutions of wire.

For adjusting the sleeves 70 74 along the bar 71 I use a threaded rod 86, passing longitudinally through the bar, which is hollow, and through a nut 87, attached to the sleeve 74, and another threaded rod 88, passing similarly through a nut carried by the sleeve 70. These two rods project through the forward end of the bar and are there adapted to receive a key or wrench by which the adjustments may be made.

The reciprocating rod 67 at the rear of the carriage carries a rack 89 and at its extreme left end carries a block 90, provided with a notch forming a kind of hook which engages an elongated pin 91, held between the arms of a yoke 92 on the end of lever 54. This construction allows the rod 67 to move with the carriage without becoming disengaged from lever 54. It will now be understood how the stop-lever 54 is thrown into the path first of one of the wings 52 and then of the other. In front of the rod 67 stands a bracket 93, depending from the under side of the carriage, in which is mounted on cone-bearings a short vertical shaft 94, carrying a pinion 95, engaging the rack 89. This shaft 94 also carries a long crank-arm 96, which swings in a horizontal plane through an arc of about three hundred degrees, being actuated by the rack and pinion first in one direction and then in the other. (See Fig. 12.) To the end of this crank is attached connecting-rod 97, extending toward the front of the carriage, where it is pivotally attached to the lower end of a post 98, depending from the under side of a slide 99. This slide is a skeleton frame extending across the width of the carriage and adapted to run in grooves 100, formed on each side thereof. Post 98 carries a laterally-projecting pin 101 for a purpose which will hereinafter appear. The slide is carried back and forth along the carriage a definite distance by the swinging of the crank 96. The rear end of the slide 99 carries a bridging cross-piece 102, somewhat elevated above the main part of the slide, upon the top of which at the middle is placed a block 103, through which a pin 104 loosely extends in a fore-and-aft direction, and immediately under the pin is a forwardly-extending hook 105, the engaging side of which is underneath. The pin is provided with a pair of adjusting-nuts 106, between which and the block 103 is a spring 107, tending to hold the pin in its extreme forward position. On each end of the cross-piece 102, and consequently at the sides of the slide, are fixed the brackets 108 and 109, in which is mounted a rod 110, carrying on one end, outside of the bracket, a crank-arm 111, having an inwardly-directed pin 112, said crank being clamped upon the rod by a screw 113, and on the other end of the rod is a crank 114, having a pin 115. In the reciprocation of the slide 99 the pin 112 of one crank strikes a stop 116, to be hereinafter described, and oscillates the rod, causing the pin on the other crank to engage and push a rod 117, also to be described hereinafter. (See Figs. 7 and 11.) On this rod 110 there is also a weighted arm 118, which returns the two cranks to their normal position when they are free to be moved and which holds said cranks in their normal position by resting upon the cross-piece 102.

In addition to the slide 99 the carriage carries another slide 119, which moves in a plane parallel to that of the slide 99 and just above it, its guiding-grooves being indicated by 120. The sides of this slide rise considerably high above the carriage to carry the bearings of various cross-shafts. Across the rear of this slide is mounted a shaft 121, which extends through one of the side pieces of the slide and carries a bevel-pinion 122, engaging with a similar pinion 123 on a shaft 124. This shaft has its bearing at one end in a bracket 125, fixed to the side of slide 119, and at the other end passes through a bearing 126, attached to a bracket 127, fixed to the carriage. Beyond the bearing 126 the shaft carries a bevel-pinion 128, through which it is adapted to slide, the pinion being splined upon the shaft. Pinion 128 engages another pinion 129, mounted on the end of a shaft 130, extending across and above the carriage and mounted in brackets 127 and 131 on opposite sides of the machine. Shaft 130 carries two downwardly-depending arms 132 132, the ends of which are adapted to be struck by the slide 99 near the end of its rearward movement and so oscillate shaft 130. This oscillation will through the bevel-gearing described be imparted to the shaft 121. The ends of arms 132 have adjustable screws to closely time the moment of contact of the slide 99. The oscillating shaft 121 carries two arms 133 133, extending forward in the slide 119 and forming a yoke to carry a knife-holding bar 134. This bar runs in vertical guides 135 in the side pieces of the slide and extends across the front of said slide, its connection with the arms 133 being by means of pin and slot to allow for the circular motion of the arms. A knife 136 is secured to the face of the holder 134 and is adapted to be carried downward to cut in front of the forward edge of a plate 137, over which the paper is led, as hereinafter described. The shape of the edge of this knife 136 is peculiar and of some importance. It will be seen that the edge inclines downward from each side toward the middle and suddenly terminates in a sharp point. (See Fig. 10.) The knife will therefore first prick a hole at the center of the sheet of paper which it is designed to sever and then cut outward in both directions to the edge. The action of the knife upon the paper in cutting in this way tends to slightly stretch the paper in the direction of its width and hold it flat against the plate until the cut is completed. The power required at any moment during the cutting operation is small, and if a shearing cut were made by a straight blade from one side of the sheet to the other the tendency would be to buckle the sheet laterally.

Across the top of the slide 119 is mounted a shaft 138, with its bearings in the side pieces of the slide and carrying a crank-arm 139 at each end and extending downward to form a yoke, between the ends of which is pivoted a frame 140, carrying a transverse roller 141, having a rubber or other gripping surface resting upon the table 137, over which the paper leads, as will hereinafter appear. One end of this roller carries a ratchet-wheel with fine teeth, with which engages a spring-pawl 142, the roller being permitted thereby to roll upon the table when it is carried backward by the yoke 139 and prevented from rolling when it is carried forward by said yoke. The frame 140 has a tailpiece 143, to which is attached a spring 144, tending to hold the roller against the table. One of the arms 139 is connected to the rod 117, which rod, as before described, is adapted to be thrust forward by the impact of the pin 115 in the crank 114, carried by slide 99. The rod 117 passes through a bearing 145 and has an adjustable stopping-collar 146 to limit the rearward stroke. Shafts 121 and 138 each have cranks connected together by a spring 147, which serves the double function of lifting the knife after the cutting operation and throwing the roller 141 backward after it has been thrust forward by the rod 117.

In the lower and rearward portion of the slide 119 is mounted a cross-shaft 148, having its bearings in the side pieces of the slide, at the middle of which is securely fixed a bell-crank 149, one arm of which extends horizontally rearward and terminates in an upwardly-facing hook 150 and the other arm of which is directed upward and provided with a shoulder 151, against which the forward end of the pin 104 is adapted to strike when the slide 99 travels forward with respect to the slide 119. When the pin strikes the bell-crank in this way, the hook 150 is brought up against the shank of hook 105, thus slightly oscillating shaft 148 and bringing the hooks into such relation that when the slide 99 starts to draw away from slide 119 the latter slide will be carried with the former. Shaft 148 extends through the side piece of the slide 119 and carries a forwardly-extending crank-arm 152, having a pin 153 at its outer end adapted to rest upon an inclined plate 154, secured to a triangular plate 155, which is connected to the side of the carriage by headed pins 156, passing through slots in the plate. At an intermediate point between the three pins 156 the plate has a laterally-projecting pin 157, which is seated so as to turn freely between adjustable screws 158 in a bracket 159, attached to the bed-plate upon which the carriage rests. It will be seen that as the pin 153 in the end of crank-arm 152 travels rearward upon the incline 154 the arm will be gradually thrown toward a horizontal position and will oscillate the shaft 148 to the same extent, the incline being such that finally the hook 150 will be carried out of engagement with the hook 105. In the forward movement of the slide 119 the pin in crank-arm 152 will travel down the incline, remaining in contact therewith by the fact of the pin 104 pressing against shoulder 151 of the bell-crank.

It has been stated that the carriage swings on its trunnions slightly during the process of winding the coils, the forward portion of the carriage being lowest at the beginning of the operation and gradually rising during the formation of the layers until it is at its highest point, when the coil is finished. Now it will be seen that since the plate 155 is held at the point 157 this upward swinging of the forward end of the carriage will cause the lower corner of plate 155 to move forward, the forward upper corner to move in an upwardly-inclined direction, and the third corner to move in a rearwardly-inclined direction, the plate meanwhile turning on the point 157. This will maintain the same angular relation of the incline 154 with respect to the slide 119, but it will hold the incline down while the carriage moves upward, thus widening the distance between the incline and the axis of crank-arm 152, so that after each upward swinging movement of the carriage at the completion of a layer of the coil the crank-pin 153 will drop lower and consequently must travel farther rearward on the incline 154 in order to release the hook 150 from the hook 105. In the operation of the machine the slide 99 goes forward, takes hold of hook 150, and pulls slide 119 back with it, and with each movement the carriage changes its position with respect to the inclined plate 154, so that hook 150 is released a little later each time and the carriage left standing a little farther to the rear each time. The forward movement of slide 119 is limited by the stop-bracket 160.

Referring now to the shaft 110, which is mounted in brackets on the cross-piece 102, forming part of the slide 99, it was stated that the crank 111 is adapted to strike a stop to oscillate shaft 110 and actuate the rod 117. This stop consists of an angular plate 116, arranged against the side of the carriage and secured thereto by means of screws 161, passing through horizontal slots in the plate. The plate extends horizontally above the trunnion, down the rear side thereof, and forwardly in a horizontal direction, where it rests against a pin 162 in the frame which supports the carriage. The opposite end of the plate is provided with a stop-shoulder 163, against which the pin 112 of the crank-arm strikes. While slide 99 is carrying the crank 111 forward toward the top 163 the crank is in its normal forwardly-inclined position. (Shown in Figs. 13 and 14.) When the crank strikes the stop 163, rod 117 is pushed forward and the roller 141 carried forward also. Now with each movement of the slide 99, as before stated, the front of the carriage lifts a little and the lower end of plate 116 is pushed against the fixed pin 162, and the whole plate is moved bodily rearward to an extent depending upon the elevation of the carriage. This brings the shoulder 163 nearer to the crank 111, and the crank strikes it earlier on each trip and is moved farther by it, thus causing the roller 141 to move farther forward at each stroke.

The double-lobed cam 56 on the intermittently-rotating shaft 37 acts, as before stated, upon a lever 57, imparting thereto a quick backward-and-forward motion at each operation. The upper end of lever 57 connects with a rod 164, which leads forward to the middle of a yoke-shaped frame 165. This frame consists of a horizontal cross-piece, L-shaped in cross-section for strength and with its arms 166 extending vertically upward on each side of the forward end of the carriage and carrying between them a rubber-covered roller 167, which normally rests upon a plate 168, extending horizontally across the front lip of the carriage and supported along its rear edge by a bar 169, pivotally attached to the carriage, so that the forward edge of the plate can swing or yield slightly in a vertical direction, it being held in its normal position by a spring 170. The strip of paper operated upon by the machine is fed forward onto the top of this plate 168 and is held thereon by the downward pressure of the roller 167. At a certain instant in the operation of the machine this roller 167 moves forward in contact with the paper to push the paper toward the winding-spindle, and for this purpose the shaft of the roller is provided with a ratchet and pawl 171, which prevents the roller from turning on its axis in making this forward movement, but permits it to turn or roll during its backward movement. The cross-piece of the yoke 165 is pivoted at 172 in a horizontal yoke 173, the arms of which extend rearwardly and are pivoted at 174 to the outside of the carriage. The point of connection between the rod 164 and the yoke 165 is immediately below the pivot 172 in a tailpiece attached to the middle point of the yoke. The cross-piece of the yoke is provided at the middle with a rearwardly-extending tongue 175, underneath which is secured a spring 176, forming an inclined cam having a track 177, of limited length, along one edge. This track is adapted to be engaged by the laterally-projecting pin 101 when the post 98 moves forward, and in this engagement it will be seen that the yoke 173 will be lifted and the roller 167 held above the plate 168 until the pin 101 passes beyond and off the track 177 of the spring, whereupon the roller drops.

Underneath the forward edge of the carriage and at the center thereof is secured an arm 178, projecting forward to overhang the front of the table and carrying at its extremity a plate 179, arranged in a vertical plane, to the front face of which is adjustably secured another plate 180, having its upper and lower edges parallel and inclined to a greater or less extent, as will be described hereinafter. The edges of this plate 180 are grasped above and below by rollers carried by an upright arm 181, rigidly secured to a horizontal rod 182, fixed to the front of the bed-plate or frame of the machine in suitable guides 183. This rod is provided with a ratchet 184, with which engages a pawl 185, carried on the downwardly-turned end of a lever 186, pivoted at 187 to the top of the base-plate and connected to another similarly-pivoted lever 188 by a link 189, said lever 188 being connected at its swinging end to the stop-lever 54 by the link 189'. By these connections the horizontal vibrations of the stop-lever 54 are imparted to the pawl 185, which accordingly moves the rod 182 step by step to the right and causes the rollers on the arm 181 to traverse the inclined edges of plate 180 and force the front end of the carriage upward. The rod 182 carries a collar 190, which is adapted to be carried against an arm 191, loosely supported upon the rod 182 and projecting downward, where it rests against the end of a lever 192, pivoted to the frame at 193. This lever carries a plate 194, containing a slot 195, having a shoulder 196. Another lever 197 extends horizontally across the face of the plate 194 and is provided with a pin 198ª, which enters the slot and is adapted to engage the shoulder 196 to prevent the upward movement of the lever 197. This upward movement of lever 197 is effected by a spring 198, connecting the ends of two cranks 199 and 200, respectively. Crank 199 is on the pivotal shaft 201 of lever 197, while crank 200 is on the pivotal shaft 193 of lever 192. When the arm 191 pushes the lever 192, the shoulder 196 is carried out of engagement with the pin on the arm 197, and the arm 197 moves upward. The pivotal shaft 201 carries a crank 202, the end of which bears against the end of the pulley-shaft 2. When the arm 197 is lifted by the spring 198, the pressure at the frictional surface between the pulleys 4 and 5 is relieved, and pulley 5, and consequently the machine, stops. This automatic stopping of the machine occurs when a helix or a number of helices simultaneously wound are finished. To start the machine, the operator throws the arm 197 down, again establishing pressure between the pulleys 4 and 5. Spring 198 besides operating the arm 197 also tends to keep the lever 192 in its position to the left.

The rubber-covered roller 206, which is shown in several of the figures resting upon the front side of the winding-spindle, is carried by two arms 207 207, pivoted to standards 208. The roller may rest by its weight on the winding-coils or be held down by a spring to help flatten and grip the paper when it is sent into the coil or coils.

The paper, which is to be inserted in separate sheets between the successive layers of the helices, is placed in the machine in the form of a roll, (indicated by 203.) It is mounted horizontally at the rear of the carriage in suitable bearings provided for the purpose, and the strip of paper (also indicated by 203) leads from it over a guide-rail 204, mounted in an arm 205, branching from the bracket 127. From the rail 204 the paper leads under the cross-piece 102 of the slide 99, thence under the shaft 148 of the slide 119, thence between the plate 137 of said slide and the gripping-roller 141, and is fed forward under the knife and between the spring-plate 168 and the roller 167 to the winding-spindle, the various steps in the feeding operation being fully set forth in the description of the operation of the machine, which will now follow.

It is considered unnecessary to give a further description of the operation of the power-transmitting devices at the left-hand side of the machine, it being understood that the shaft 37 makes intermittent half-rotations always in the same direction and that the rack-rod 61 slowly reciprocates, its direction of movement being changed each time the shaft 37 makes its quick half-rotation. The coil or coils of wire are preferably wound upon a tube of insulating material, (shown at the center of Fig. 17,) which is preferably made of paper, paraffined or otherwise suitably treated. Upon this tube is to be wound one or more coils, depending upon its length and upon the length of the coils to be wound; but it will be understood in the description which follows that five coils are simultaneously wound upon separated zones of the tube. The tube is placed over the winding-spindle by first unlatching and swinging forward the block 15 to uncover the right-hand end of the winding-spindle 13. The tube is then slipped over the winding-spindle and forced into the jaws of the chuck 209 and clamped therein by setting up the screw 210. Block 15 is then swung in place to support the right-hand end of the spindle. Next the strands of bare wire 211 and the strands of silk 212 are led from the spools, which, it will be understood, are located at the rear of the machine in a suitable rack, (not herein further referred to,) over the rails 87', thence over the front of guide-wheel 84, thence behind guide-wheel 85, and finally to the paper tube, where the ends may be held by a slight cut in the surface of the tube under which the ends are passed. It will be understood that a copper wire and a silk thread are passed together over the guide-wheel to the tube, whereon they naturally rest side by side and maintain this position throughout the winding operation. When the coils are started, the front end of the carriage is tilted downward to its lowest position, (shown best in Fig. 15,) it having been thrown into this position manually by the operator in moving the arm 181 to its extreme position to the left, as shown in Fig. 2. The machine is started by forcing the lever 197 downward until the pin carried by it is caught under the shoulder 196, lever 192 having been pulled to the left by its spring to effect this engagement. The winding-spindle commences to rotate, the guide-rod 76 moves in the direction of its length, and the first layer of winding is made. At the end of the layer the stop-lever 54 passes out from beneath the wing 53 and shaft 37 makes a quick half-turn, which reverses the direction of movement of rack-rod 61, and consequently reverses the direction of movement of the guide-rod 76, thus starting a new layer of winding, which is put on over the first layer. While the layer is being formed the stop-lever passes slowly across the face of the wing which lies against it, and at the finish of the second layer it releases the wing, permitting another half-rotation of shaft 37, and intercepts the next wing. Thus the layers are formed one after another in much the same manner as is done by other winding machinery. At the end of the coil when all the layers have been put on the machine automatically stops by the collar 190 on rod 182 striking the arm 191 and forcing the lever 192 to the right. The mechanism for accomplishing this is adjustable, so that the machine may be set to wind a predetermined number of layers before it is stopped. This is accomplished by means of the rack 184 on the rod 182. It will be seen that the slow motion of the stop-lever 54 during the formation of a layer is imparted through the several connecting links and levers to the pawl 185. A motion of the pawl to the left carries it back the space of one tooth on the rack, and the motion of the pawl to the right feeds the rod the space of one tooth. Hence at the finish of every two layers the collar 190 is pushed a step toward the arm 191, and by putting a scale on the rod 182 beside the rack 184 the rod may be definitely shifted, so as to make the distance between the collar 190 and the arm 191 correspond to the number of layers to be wound before the machine shall be stopped. In thus winding the coils layer upon layer it will be understood that the diameter of the coil increases a constant amount with each layer, depending upon the thickness of the material wound on, and that the tangential point of the strands leading to the coil from the guide-wheels gradually recedes from the front of the carriage, owing to the enlargement of the coil and the elevating of the guide-wheels, this being illustrated in Fig. 18.

Figure 14:
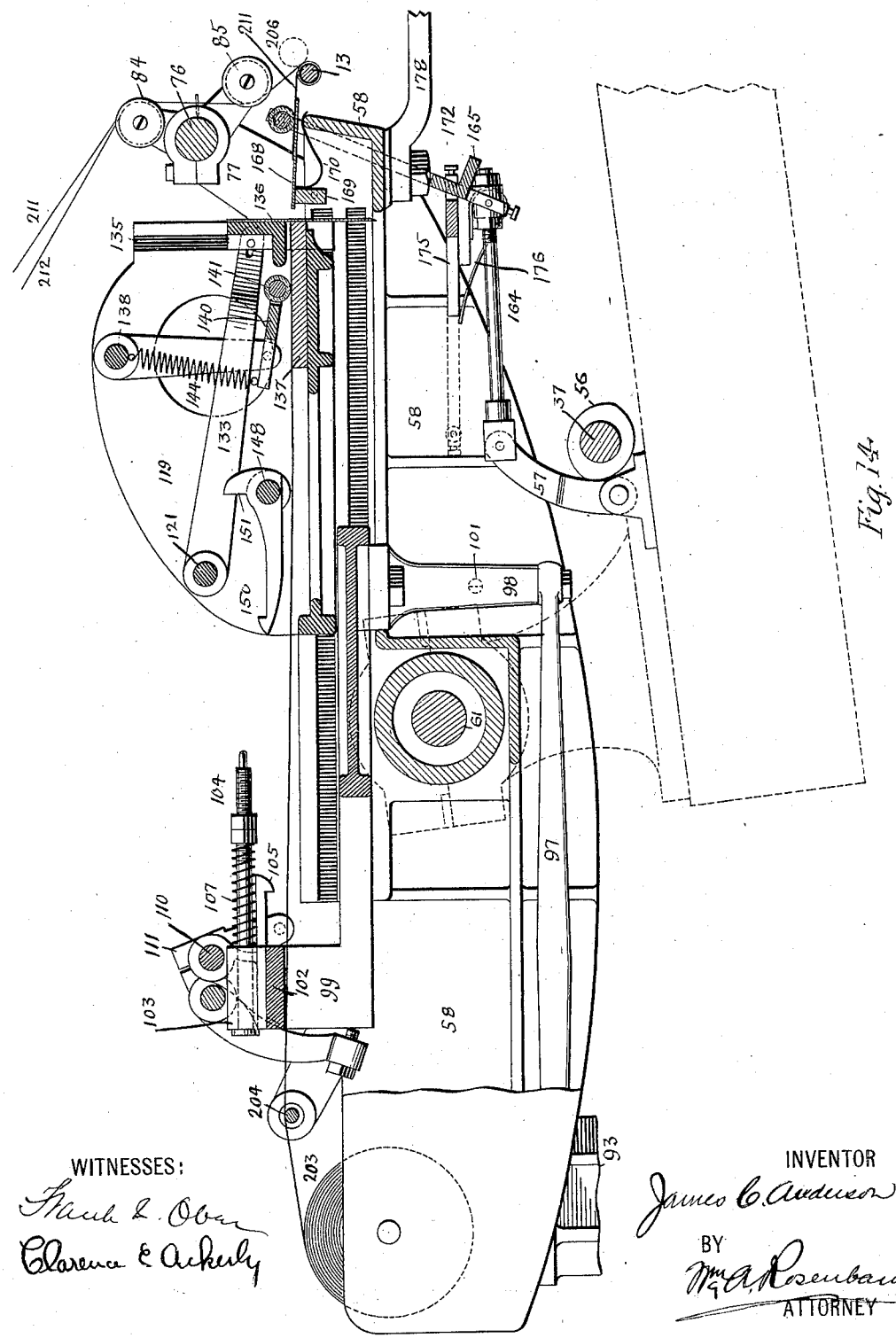

Referring now to Fig. 14, the mechanism is shown in the position occupied when a sheet of paper (indicated by 211) is being injected into the coil, at which instant one layer is finished and the next begins. At this time it will be seen that the knife is down, having just previously cut off the strip 211, and is about to rise. The crank 96 is at one limit of its stroke, and the post 98 and slide 99 are consequently in their most rearward position. The slide 119 is also in its rearward position, which, however, at the beginning of the coil is at a very short distance from its most forward position. As the size of the coil increases the backward stroke of the slide 119 is longer and longer. The end of the strip of paper is now abutting against the rear of the knife and held there by the roller 141. Now as the crank 96 swings toward the other limit of its stroke the slide 99 is carried forward and the knife is at once lifted by the slide 99 leaving the arms 132. Next the pin 104 strikes arm 151 of the bell-crank carried by the slide 119, and the slide is pushed forward to the end of its stroke, the spring 107 being strong enough to accomplish this without materially yielding. At the same time the hook 150 is caused to rise into a position where it will engage the hook 105 on the retreat of slide 99. During this forward movement of the slide 119 the paper is carried along with it by reason of the grip of roller 141. As soon as slide 119 comes to a stop the continued movement of slide 99 causes the spring 107 to yield, as shown in Fig. 12, and during this independent movement of slide 99 the crank 111 on the right-hand side of the machine strikes the stop 163 and throws the crank 114 against the push-rod 117, which swings roller 141 forward into the position shown in Fig. 11 and pushes the end of the paper strip forward. While this latter movement is taking place the pin 101 on the post 98 strikes the track 177 on the spring 176 and lifts the roller 167, allowing the end of the strip of paper to pass beneath the roller onto the plate 168. Immediately thereafter the pin 101 runs off of the track 177 on the spring and roller 167 falls upon the projecting end of the paper strip and grips it. The end of the paper is held in this position by roller 167, while the slide 119 is dragged backward to the cutting position. It will be observed that the crank 96 has swung only about one hundred and fifty degrees of its travel in carrying the slides forward, and it is on the second one hundred and fifty degrees, completing the full swing of the crank, that the slides are moved rearward. When this rearward motion commences, the crank 111 leaves the stop 163 and assumes its normal angular position (shown in Figs. 13 and 14) by reason of the falling of the weighted arm 118. At the same time, crank 114 being removed from the end of the rod 117, the roller 141 is rolled backward over the paper without exerting any friction thereon by the spring 147. It will also be noted that on the return of the post 98 the pin 101 rides on top of spring 176, causing it to open and allow the pin to pass between the spring and the tongue 175, as shown in Fig. 12. In the backward movement of slide 99 the hook 105 engages hook 150 and drags slide 119 backward until the hooks are released, and this releasing is accomplished by the crank 152, acted upon by the incline 154. In other words, as soon as the crank-pin 153 has been lifted sufficiently by the incline 154 the hooks become disengaged and slide 119 is left standing, while the slide 99 continues on rearward. The position after the release of the hooks and before the completion of the rearward stroke of slide 99 is shown in Fig. 13. The point at which the forward end of slide 119 is left standing determines where the paper will be cut, because the knife travels back with the slide. At the end of its rearward stroke slide 99 strikes the arms 132, swings them, and rotates the gearing 129 128 and 123 122, causing the knife to be thrown down and sever the paper strip while the latter is being held on both sides by the rollers 141 and 167. As soon as the knife has fully cut the paper and before it rises the reversing takes place—that is to say, the shaft 37 makes its quick half-rotation and the layer of winding is terminated and a new layer commenced. At this instant of reversing the cam 56 vibrates the lever 57, which in acting through the connections 164 and 165 quickly throws the roller 167 forward, and the roller being prevented from turning pushes the forward edge of the severed piece of paper into the coil, where it strikes the tangent-point and is at once grasped by the strands and by the roller 206 and wound into the coil simultaneously with the first turn of winding in the new layer. Immediately after injecting the paper in this way the roller 167 is carried back by the spring 167$^a$, (shown in Fig. 11 and in dotted lines in Fig. 7,) the cam 56 permitting this and the roller being free to turn, so as not to interfere with the outward movement of the paper which it has just acted on. This completes a cycle of the movements of the machine, it being understood that the paper is fed and cut off during the winding of a layer and the severed end is injected into the coil simultaneously with the change from one layer to the next.

Now since it is the function of this machine to insert or wind on a sheet of paper at the completion of each layer of wire, which sheet is to be just long enough to surround the coil and slightly overlap, it is evident that the length of each successive sheet must be increased to an amount proportional to the increased diameter of the coil, and, further, since in inserting a sheet of paper in this way without stopping the winding-spindle it is essential that the forward edge of the paper when it is fed into the coil be actually delivered to the tangent-point of the strands in order to have the paper caught at once and carried into the coil by the natural grip of the strands upon it and at the speed of the spindle it is necessary to carry each successive sheet a little farther forward, depending upon the increased distance of the tangent-point of the strands from the front of the machine whence the paper issues. Again, since the forward edge of the paper must be delivered directly to the tangent-point of the strands instead of first striking the strands or the surface of the coil back of the tangent-point and then deflated into the tangent-point it is necessary that the paper-delivery mechanism should rise with respect to the winding-spindle as each layer is formed, so as to keep the path of travel of the paper in line with the tangent-point.

The lifting of the carriage (upon which is mounted the paper-delivery mechanism) to keep the path of travel of the paper in line with the upper surface of the coil is accomplished by the arm 181, with its rollers, and the inclined plate 180, which is secured to the front of the carriage. With each movement of the rod 182 under the action of the pawl 185 the carriage is lifted an amount corresponding to the incline of the edges of said plate 180. This lifting actually takes place after every two layers, because it is only in the forward stroke of the pawl 185 that the rod 182 is moved; but this is sufficient for practical purposes. Since the plate 180 is adjustably connected to the plate 179, the incline of the former plate may be made more or less to correspond with the thickness of each layer of the coil. Thus if heavy wire is used each layer will be thicker and the lifting of the carriage must be greater than if a finer wire were used.

As to the devices for compensating for the increase in size of the coil, it has been found unsatisfactory and impractical to embody such compensating devices in either one of the two parts which feed the paper, and accordingly such compensating devices have been distributed or divided between the said parts. The two parts referred to are the slide 119, which goes back to take hold of a new place on the paper and bring it forward, and the roller 141, which shoves the paper under and beyond the knife. If, for instance, the the slide 119 did not move and the paper was fed entirely by the roller 141, moving a little farther each time, it would be necessary to have the winding-spindle a greater distance from the roller 167 in order to accommodate in the space between the spindle and the knife the long sheets that would be sent out by roller 141 when the coil was nearly finished, and consequently the shorter sheets sent out by roller 141 at the beginning of the coil would have to be carried through the air by roller 167 a longer distance, and this is impracticable.

The automatically-adjusting stop 163, as before described, is moved rearward by the impact of plate 116 against the pin 162 when the forward end of the carriage rises. This plate is so set that its total displacement by the lifting of the carriage is equal to the total distance which the tangent-point on the coil recedes from the front of the machine, and consequently each time the plate is displaced it makes the throw of lever 111, and consequently of the roller 141, enough longer to compensate for the new position of the tangent-point at the beginning of a new layer. If the stop 163 were fixed, the amount of throw of roller 141 at each operation would be constant and dependent upon the independent forward movement of the slide 99 during the compression of spring 107, so that by making the independent movement of slide 99 greater the constant feed of the roller 141 can be increased. It will therefore appear that each time the roller 141 feeds the paper forward it sends its forward edge a little nearer to the tangent-point to compensate for the recession of the tangent-point at the beginning of the next layer. This is necessary, because the throw of the roller 167 is constant, and, as before stated, it must always be able to deliver the forward end of the paper into the grip of the strands at the tangent-point.

It will be remembered that after the end of the paper has been fed out by the roller 141 and gripped by the roller 167 the slide 119 moves back to the cutting position, while the paper remains stationary. The extent of this backward movement of the slide constitutes its contribution to the feed of the paper, and this is made more each time to provide for the necessary increase of length of paper due to the increase in diameter of the coil. For this purpose the plate 155, carrying the incline 154, is prevented from rising as a whole when the forward end of the carriage rises. By this means the crank-pin 153, and consequently the slide 119, must travel farther rearward at each operation before the hooks 150 and 105 are disengaged and the slide 119 left standing. The angle which the incline 154 makes with the guides of the slide 119 remains constant after having once been determined; but when the thickness of the layers to be wound changes the incline 154 may be correspondingly shifted, so that the uniform increase in the backward movement of the slide will be greater or less, depending upon the requirements.

When the machine stops at the end of the winding operation, the operator secures the loose ends of each layer, then cuts the strands, then uncovers the right-hand end of the winding-spindle, loosens the clutch 209, and pulls off the tube carrying the five coils from the spindle. He then adjusts a new tube and starts the machine as before.

As it sometimes happens that the copper wire breaks during the winding operation, the operator must stop the machine and splice the broken strands. The machine is stopped by simply forcing the lever 192 toward the right, and for this purpose it is provided with a handle 192ª. The splicing of the wire makes an enlargement therein, which unless given more lateral space in the coil might create a short circuit in the coil and in any event would interfere with the uniform winding. For this purpose means has been provided for making a little more space on the coil for the reception of the enlargement in the wire. This means consists of the hand-wheel 80 and screw 78, located in the block 62 on the end of the rack-rod 61. It will be seen that by rotating this hand-wheel in one direction or the other the block can be forced inward or outward with respect to the rod 61 and that the guide-rod 76, as well as all other parts connected with the block 62, will be moved in a direction depending upon the direction of rotation of the hand-wheel. The operator will rotate the hand-wheel in the direction to carry the strands slightly forward, so that when the machine is again started a vacant space will be left in the layer which will be occupied partly by the enlargement of the wire. This enlargement of course will affect only one coil; but the setting of the feed ahead in the manner described will create vacant spaces in all of the coils.

As before stated, the number of coils that are simultaneously wound by this machine makes no difference in the operation. The sheet material which is automatically inserted between the layers is simply made wide enough to extend throughout all the coils on the spindle, and five or ten coils can be wound as quickly and perfectly as a single one.

Having described the invention, I claim—

1. In a machine for winding fibers, filaments or strands, the combination of a winding-spindle, means for feeding the fibers, filaments or strands thereon in layers to form a coil, and means for automatically inserting a sheet material between the layers of the coil, substantially as described.

2. In a machine for winding fibers, filaments or strands into coils, bobbins or helices, the combination of a winding-spindle and means for automatically inserting sheet material at intervals in the coil, bobbin or helix, substantially as described.

3. In a machine for winding fibers, filaments or strands into coils, bobbins or helices, the combination of a winding-spindle, means for automatically inserting sheet material at intervals in the coil, and means for increasing the length of such sheets as the diameter of the coil increases.

4. In a machine for winding fibers, filaments or strands into coils, bobbins or helices, the combination of a continuously-rotating winding-spindle and means for inserting sheet material at intervals in the coil, bobbin or helix, substantially as described.

5. In a machine for winding fibers, filaments or strands, the combination of means for winding layer upon layer, means for inserting sheet material between the layers, and a device serving to reverse the direction of feed and insert the sheet, substantially as described.

6. The combination with a core or spindle, of means for automatically separating sheet material into pieces successively increasing in size, and winding them successively upon the core or spindle.

7. The combination with a core or spindle, of means for automatically separating sheet material into pieces successively increasing in size, delivery mechanism for feeding the separated pieces to the spindle, and means for shifting the delivery mechanism and spindle with respect to each other to compensate for the increasing diameter of the material on the spindle.

8. The combination with a winding-spindle, of means for winding a plurality of coils or bobbins of material thereon, and means for inserting sheets of material at intervals in said coils, each sheet being common to all the coils.

9. The combination with a continuously-rotating winding core or spindle, of means for winding a plurality of coils of material thereon, and means for inserting sheets of material at intervals in said coils, each sheet being common to all the coils.

10. In a machine for winding fibers, filaments or strands into coils or bobbins, the combination of a winding core or spindle, mechanism for injecting sheet material at intervals into the coils, and means for shifting the positions of the injecting mechanism and spindle or core with respect to each other, for the purpose set forth.

11. In a machine for winding fibers, filaments or strands into coils, bobbins or helices, the combination of a continuously-rotating winding spindle or core mechanism for injecting sheet material at intervals into the coils and means for shifting the positions of the injecting mechanism and spindle or core with respect to each other for the purpose set forth.

12. In a machine for winding fibers, filaments or strands into coils, bobbins or helices, the combination of a continuously-rotating winding spindle or core mechanism for injecting sheet material at intervals into the coils and means for shifting the positions of the injecting mechanism and spindle or core with respect to each other for the purpose set forth, said means being operative during the formation of a layer of the fibers, filaments or strands.

13. In a machine for winding fibers, filaments or strands into coils, bobbins or helices, the combination of a winding-spindle and a carriage movable with respect to each other, means for winding the fibers, filaments or strands in layers, means for injecting sheet material into the coil and means for shifting the relative positions of the carriage and spindle during the formation of a layer.

14. In a machine for winding fibers, filaments or strands into coils, bobbins or helices, the combination of a stationary winding-spindle and a carriage movable with respect thereto, means for winding the fibers, filaments or strands in layers, means for injecting sheet material from the carriage into the coil at the termination of each layer, and means for shifting the relative position of the carriage with respect to the spindle.

15. In a machine for winding fibers, filaments or strands into coils, bobbins or helices, the combination of a core or spindle and a carriage movable with respect to each other, feeding devices for sheet material carried by the carriage, an ejector for the sheet material also carried by the carriage and to which the feeding devices deliver the sheet material, and means whereby the ejector is operated at the end of each layer of the fibers, filaments or strands on the spindle.

16. In a machine for winding fibers, filaments or strands into coils, the combination of a winding-spindle, a carriage movable with respect thereto, feeding devices for a continuous strip of sheet material carried by the carriage, a knife for cutting the strip, an ejector adapted to act on the cut-off strip and also carried by the carriage and means for operating the ejector at the end of each layer of the strands on the spindle.

17. In a machine for winding fibers, filaments or strands into coils, bobbins or helices, the combination of a winding-spindle, movable guides directing the strands to the spindle, devices for feeding sheet material, an injector having a fixed throw for injecting the sheet material into the coils at intervals, and means whereby the devices for feeding the sheet material will vary the feed to correspond with the shifting of the position of the tangent-point of the strands upon the coil.

18. In a machine for winding fibers, filaments or strands into coils, bobbins or helices, the combination of a winding-spindle, guides directing the strands to the spindle, said guides having a motion tending to change the position of the tangent-point upon the coils, devices for feeding sheet material, an injector having a fixed throw for injecting the sheet material into the coils at intervals, a feed-controller actuated in unison with the said movement of the guides, whereby the feed of the sheet material will be altered to correspond with a changed position of the tangent-point on the coil.

19. In a machine for delivering sheet material to a winding-spindle, the combination of feeding devices for a strip of the sheet material, devices for severing the strip, means for holding the strip after it has been fed, and means for moving the severing devices backward upon the strip to the severing position.

20. In a winding-machine, the combination of a winding-spindle, feeding devices for a strip of sheet material, a severing device arranged to travel backward with reference to the direction of feed to its severing position, and means whereby the said backward travel is varied.

21. In a winding-machine, the combination of a winding-spindle, feeding devices for a continuous strip of sheet material, a knife arranged to travel backward with reference to the direction of feed to its cutting position, and means whereby the said backward travel is gradually increased in proportion to the increase in diameter of the material wound onto the spindle.

22. In a winding-machine, the combination of a winding-spindle, feeding devices for a continuous strip of sheet material, a knife-carrier arranged to travel backward with reference to the direction of feed, a reciprocating element for moving the carrier, a coupling one part of which is attached to the knife-carrier and the other part to said element, and means whereby the coupling will release the carrier at a different position on each stroke of the reciprocating element.

23. The combination of a winding-spindle and carriage movable with respect to each other, feeding devices for a continuous strip of sheet material, a knife-carrier adapted to carry a knife to its cutting position, a reciprocating element arranged to move the knife-carrier, a coupling adapted to connect the carrier and reciprocating element together, means for moving the spindle and carriage relatively to each other, and means whereby such relative movements will determine when the said coupling is released.

24. In a winding-machine, the combination of a winding-spindle, means for feeding a continuous strip thereto, two slides, one of which carries a knife, a coupling connecting the slides together, means for releasing the coupling at varying positions in the stroke of the slides, and means whereby the knife is actuated to cut the strip at the end of the movement of that slide in which the knife is not located, substantially as described.

25. In a winding-machine, the combination of a winding-spindle, means for feeding a continuous strip thereto, a knife for severing the strip after it is fed, said means for feeding consisting of two independent parts acting successively upon the strip and each part being adapted to gradually increase its feed, substantially as described.

26. In a winding-machine, the combination of a winding-spindle, means for feeding a continuous strip thereto, a knife for severing the strip after it is fed, said means for feeding consisting of two reciprocating slides, one of which is adapted to be moved by the other, a coupling adapted to connect and disconnect the slides, means actuated in accordance with the amount of feed required, for controlling said coupling, one of the slides carrying gripping devices for holding the strip during one movement of the slide and also independent feeding devices for moving the strip after the slide stops, substantially as described.

27. In a machine for winding strands and sheet material into coils, the combination of a reciprocating block, two levers each hinged at one end to said block and at the other respectively hinged to two reciprocating rods, one of which guides the strands and the other controls the feed of the sheet material, said levers being pivoted between their extremities.

28. In a machine for winding strands and sheet material into coils, the combination of a reciprocating block, two levers each hinged at one end to said block and at the other respectively hinged to two reciprocating rods, one of which guides the strands and the other controls the feed of the sheet material, said levers being pivoted between their extremities upon adjustable pivots, substantially as described.

29. In a machine for winding strands and sheet material into coils, the combination of a winding-spindle, a reciprocating block, two levers each hinged at one end to said block and at the other respectively hinged to two reciprocating rods, one of which guides the strands to the spindle to form layers and the other controls the feed of the sheet material toward the spindle, and an intermittently-rotating shaft whose motion reverses the direction of movement of the said first-mentioned reciprocating rod and simultaneously injects sheet material into the coil, substantially as described.

30. In a machine for winding sheet material into coils, the combination of a stationary winding-spindle, a pivoted carriage, a slide on said carriage whose motions effect the feeding of the sheet material, and means whereby the movement of the carriage on its pivot will vary the extent of feed caused by the slide.

31. In a machine for winding sheet material into coils, the combination of a stationary winding-spindle, a pivoted carriage, a slide on said carriage whose motions effect the feeding of the sheet material, a coupling through which the slide is dragged along, a crank carried by the slide and adapted to release said coupling, an incline over which the end of the crank moves when the slide moves, means for changing the relative position of the incline and slide when the carriage is moved on its pivot, to thereby obtain different releasing positions of the coupling, substantially as described.

32. In a winding-machine, the combination of an intermittently-rotating shaft, a reciprocating rod whose direction of movement is reversed by the rotation of said shaft, a strand-guide moved by said rod, a winding-spindle, and a device for injecting sheet material into the winding-coil, said device being operated by the intermittent rotations of the shaft, substantially as described.

33. In a winding-machine, the combination of a winding-spindle and a carriage movable with respect to each other, the carriage carrying devices for feeding sheet material to the winding-spindle, and means whereby the spindle and carriage are moved with respect to each other in proportion to the increase in size of the material on the spindle.

34. In a winding-machine, the combination of a reciprocating block, a reciprocating rod carrying guiding devices for the material to be wound, and a pivoted lever hinged to the block and rod, substantially as described.

35. In a machine for winding material in the form of strands, fibers or filaments and sheets, the combination of means for winding the strands, fibers or filaments in layers, means for winding the sheet material at the end of each layer, and means for reversing the direction of traverse of the strands, fibers or filaments to superpose the layers.

36. In a winding and wrapping machine, the combination of a core or spindle means for winding fibers or filaments thereon in layers, means for applying sheet material to the surface of the layers, and a device for separating the sheet material into parts or pieces of respectively varying size.

37. The combination with a core or spindle, of means for automatically separating sheet material into parts or pieces and wrapping them successively upon said core or spindle.

38. The combination with a core or spindle, of means for automatically separating sheet material into parts or pieces, successively increasing in size, delivery mechanism for feeding the separated pieces to the core or spindle, and means for shifting the delivery mechanism and core with respect to each other, to compensate for the increasing diameter of the coil.

39. In a winding and wrapping machine, the combination of a core or spindle, means for winding and feeding fibers or filaments thereon at two or more zones simultaneously, and means for projecting the edge of a material in sheet form into the tangent-point between the fibers or filaments and the surface of the coil.

40. In a winding and wrapping machine, the combination of a core or spindle, means for winding and feeding fibers or filaments thereon at two or more zones simultaneously, means for projecting the edge of a material in sheet form into the grip of the fibers or filaments, and a device resting upon the surface of the coils and adapted to engage the sheet material.

41. In a winding and wrapping machine, the combination of a core or spindle, means for winding and feeding fibers or filaments thereon at two or more zones simultaneously, means for projecting the edge of a material in sheet form into the grip of the fibers or filaments, and a roller engaging the surface of the coils and sheet material.

42. The combination with a core or spindle, of means for winding a plurality of coils thereon and means for inserting sheet material at intervals in said coils, each sheet being common to all the coils.

43. The combination with a continuously-rotating winding core or spindle, of means for winding a plurality of coils thereon, and means for inserting sheet material at intervals in said coils, each sheet being common to all the coils.

44. In a machine for winding and wrapping fibers or filaments into coils, the combination of a winding core or spindle, mechanism for injecting sheet material at intervals into the coils, and means for changing the relative position of the injecting mechanism with respect to the coils for the purpose set forth.

45. In a machine for winding and wrapping fibers and filaments, the combination of a core or spindle, means for winding the fibers or filaments thereon, a source of supply of sheet material, feeding devices for advancing in such sheet material, and means for separating said material into parts or pieces and for feeding the same successively to the core or spindle.

46. In a winding-machine, the combination of a winding core or spindle, a rod or foundation carrying a plurality of guides for fibers, filaments or strands, said spindle and rod or foundation being bodily movable with respect to each other for the purpose of forming layers upon the spindle.

47. In a winding-machine, the combination of a winding core or spindle, a rod or foundation carrying guides for fibers, filaments or strands, said spindle and rod being bodily movable with respect to each other, a reciprocating block, a lever hinged to the block and to the said rod or foundation and itself pivotally mounted upon an adjustable support.

48. In a winding-machine, the combination of a source of power, guiding devices for the material to be wound, a reciprocating element connected with the guiding devices, a shaft adapted to reverse the movement of the reciprocating element, a spring and a friction-coupling connecting said shaft with the source of power, a stop preventing the rotation of said shaft, and means for removing the stop at intervals.

49. In a winding-machine, the combination of a source of power, guiding devices for the material to be wound, a reciprocating element connected with the guiding devices, a shaft adapted to reverse the movement of the reciprocating element, a spring interposed between the shaft and the source of power, a stop preventing the rotation of the shaft, means for removing the stop at intervals, and a load or retarding device applied to the shaft.

In witness whereof I subscribe my signature in presence of two witnesses.

JAMES C. ANDERSON.

Witnesses:
WM. A. ROSENBAUM,
CLARENCE E. ACKERLY